United States Patent [19]
Harding et al.

[11] Patent Number: 5,592,668
[45] Date of Patent: * Jan. 7, 1997

[54] METHOD AND APPARATUS FOR SPECIFYING A QUERY TO AN INFORMATION SYSTEM USING NATURAL LANGUAGE-LIKE CONSTRUCTS

[75] Inventors: James A. Harding, Issaquah; Jonathan I. McCormack, Renton, both of Wash.

[73] Assignee: Asymetrix Corporation, Bellevue, Wash.

[ * ] Notice: The term of this patent shall not extend beyond the expiration date of Pat. No. 5,495,604.

[21] Appl. No.: 488,384

[22] Filed: Jun. 6, 1995

Related U.S. Application Data

[62] Division of Ser. No. 112,852, Aug. 25, 1993, Pat. No. 5,495,604.

[51] Int. Cl.$^6$ .................................................. G06F 17/30
[52] U.S. Cl. ............................................... 395/602; 395/12
[58] Field of Search ......................................... 395/600, 161, 395/12, 155

[56] References Cited

U.S. PATENT DOCUMENTS 4,506,326  3/1985  Shaw et al. ............................. 395/600

OTHER PUBLICATIONS

Anick, P. G., et al. "A Direct Manipulation Interface for Boolean Information Retrieval via Natural Language Query" ACM SIGIR '90, pp. 135–150, Sep. 1990.

Czejdo, B., et al., "A Graphical Data Manipulation Language for an Entity–Relationship Model" IEEE Computer, pp. 26–36, Mar. 1990.
Czejdo, B., et al. "A Visual Query Language for an ER Data Model" 1989 IEEE Workshop on Visual Languages pp. 165–170, 1989.
Kamel, M., et al., "A Graph Based Knowledge Retrieval System" IEEE Int'l Conf. on Systems, Man, and Cybernetics, pp. 269–275, 1991.
Sockut, G. H., et al. "GRAQULA: A Graphical Query Language for Entity–Relationship or Relational Databases" IBM Research Report (#73,833), Mar. 14, 1991.
Young, D. et al. "A Graphical Filter/Flow Representation of Boolean Queries: A Prototype Implementation and Evaluation" J. Am. Soc. for Information Science, vol. 44, No. 6, pp. 327–339, Jul. 1993.
Keim, D. A., et al. "Visual Query Specification in a Multimedia Database System" Proc. IEEE 1992 Conf. on Visualization pp. 194–201, 1992.

*Primary Examiner*—Thomas G. Black
*Assistant Examiner*—Peter Y. Wang
*Attorney, Agent, or Firm*—LaRiviere, Grubman & Payne

[57] ABSTRACT

Computerized tools for modeling database designs and specifying queries of the data contained therein. Once it is determined that an information system needs to be created, the Fact Compiler of the present invention is invoked to create it. After creating the information system, the user creates a fact-tree as a prelude to generating queries to the system. After creating the fact-tree, the user verifies that it is correct using the Tree Interpreter of the present invention. Once the fact tree has been verified, the Query Mapper of the present invention is used to generate information system queries.

12 Claims, 22 Drawing Sheets

METHOD AND APPARATUS FOR SPECIFYING A QUERY TO AN INFORMATION SYSTEM USING NATURAL LANGUAGE-LIKE CONSTRUCTS

This application is a division of application Ser. No. 08/112,852, filed Aug. 25, 1993, now U.S. Pat. No. 5,495,604.

TECHNICAL FIELD

This invention relates to the creation of computer database systems and the querying of data contained therein. In particular, the invention relates to computerized tools for modeling database designs and specifying queries of the data contained therein.

BACKGROUND ART

Computerized relational databases are used to form information systems which model real world issues and are composed of objects, the relationships i.e., facts, between those objects and the constraints and rules which govern these relationships and objects. Objects are physical or logical entities, capable of being uniquely identified. In this respect, objects are said to be essentially noun-like. Facts define the manner in which objects interact with one another, and are essentially verbs or are verb-like. Constraints modify or constrain the inter-relationships between objects and facts, and as such are analogous to adverbs and pronouns. As the use of information systems increases and the design of such systems advance, so increases the complexity of the real world issues they are expected to accurately model.

In creating an information system, a user needs to accurately transform the real world model, also known as the external view of the data, to its actual physical implementation, using a particular database language on a particular computer system. This implementation is also called the physical view. In order to realize the power inherent in relational databases, it must be made possible for someone with no computing background or education to be able to design and implement information management systems and query meaningful data from them without having to learn a specific computer language.

The physical view of an information system is expressed in one of a number of database design languages. Examples of database design languages well known to those skilled in the art include Structured Query Language (SQL) and Microsoft Access. These database design languages are well adapted to carry out the storage and subsequent retrieval of data stored therein, but the languages themselves are both unnatural and highly technology specific. This means that database design languages are not typically used or understood by the end users of the information systems the languages model. The use of these design languages is a largely intuitive process practiced by database analysts who are familiar with the internal complexities of such languages.

The transformation of an information system from its external view to its physical view is time consuming, and at once formalized while remaining something of an art form. In order to assist database analysts in modeling data for information system design, several Computer Aided Software Engineering (CASE) tool sets have been developed, and are well known to those skilled in the art.

Prior art CASE tool sets were generally based upon entity-relationship modeling (ER). ER models, while providing a useful means of summarizing the main features of an application, are typically incapable of expressing many constraints and derivation rules that commonly occur in that application. An overview of ER-base tools may be found in Ovum (1992) and Reiner (1992) A state-of-the-art example is discussed in Czejdo et at. (IEEE Computer, March 1990, pp. 26–37).

In order to capture much more of the detail of an application, object-role modelling (ORM), also known as fact-oriented modeling, was developed. Well known prior art versions of ORM include Natural-Language Information Analysis Method (NIAM), Binary-Relationship Modelling (BRM), Natural Object Role Modelling (NORM), and Predicator Set Model (PSM). One version of ORM, Formal Object Role Modelling (FORM) is based on extensions to NIAM and has an associated language (FORML) with both graphical and textual forms (Halpin and Odowska, 1992). FORM and FORML were developed in part by one of the inventors of the present invention.

The use of symbol-driven CASE tool sets provides a powerful instrument for conceptualizing the model of a given information system, but their use is not intuitively obvious to the untrained user. For such a user, being able to model information systems using a language with which the user is already facile is a more powerful approach. FORML provides the user with a natural language-like command set, and is thus readily learned.

Several CASE tool sets for object-role modeling exist. Among those known by persons skilled in the art are RIDL (Detroyer et at, 1988; Detroyer 1989; Nienhuys-Cheng 1990), GIST (Shoval et al, 1988) and IAST (Control Data, 1982). RIDL is currently marketed by Intellibase. These ORM-based CASE tool sets generally conform only to a binary-only version of ORM, although RIDL has recently added support for fact types of higher arity. In general, these systems are based upon the explicit "drawing" of symbols on diagram. Users of these tool sets typically specify their information systems by placing symbols directly on diagrams. In the typical CASE tool set, a different tool is used for each type of symbol used. The emphasis in these tool sets is on the notation of the symbols and what they mean, not the underlying semantics of the language upon which the notation rests.

An "optimal normal form" method for mapping from ORM to normalized relational tables was introduced in NIAM in the 1970's. This method ignored certain cases and provided a very incomplete specification of the methodology for constraint mapping. A significant extension of NIAM, capable of completely mapping any conceptual schema expressed in the graphic version of FORML to a redundancy-free, relational schema, was introduced as RMAP (Relational Mapping, Ritson and Halpin, 1992). RMAP differs from other mapping methods, such as RIDL-M, by enabling a wider variety of constraints; e.g., n-ary subset, equality, exclusion, closure and ring constraints.

Database professionals, using ORM-based CASE tool sets are markedly more productive than similar workers without them. A tool set which contains a mapping schema such as RMAP is even more powerful, and results in further productivity. FORML based tool sets which implement RMAP represent the current state of the art with respect to ORM-based tool sets. Given FORML's graphical and textual language forms, the potential exists to combine the power, flexibility and precision of ORM based CASE tool sets with the ease and rapidity of use of graphical user interfaces common in modern computer systems. This will have the effect not only of further increasing the productivity of CASE tool sets in the hands of computer professionals, but will place these powerful software engineering tools in the hands of heretofore naive users as well.

While prior art natural language CASE tools do fulfill some of the promise of their basic concept, they lack the power of the symbol driven systems to model complex databases with facility. Until the present invention, there existed no CASE tool set for database design which combined the power, flexibility and accuracy of ORM using natural language-like constructs with a graphical user interface to translate the natural language-like constructs into ORM symbology and automatically map the conceptual schema so formed into a relational schema for implementation on a number of SQL-like database languages. The present invention effects a six-fold reduction in the number of user operations necessary to draw symbols on ORM-based diagrams by allowing users to type information in an approximately natural language. Users can think about the semantics of information and not waste time laboring on symbol drawing, which dampens the semantic thought process.

In addition to the ER and ORM-based prior art tool sets previously discussed, there have been efforts by other workers to automate the process of database specification using different methodologies. Some of the more pertinent attempts are described below.

U.S. Pat. No. 4,688,196 to Thompson et. al. teaches a natural language interface generating system which allows a naive user to create and query a database based on a system of menu-driven interfaces. As the user addresses command words, in a natural language, to the interface generating system it provides a menu of words which could legally follow each word as it is input. The menu is provided by referencing pre-defined, resident files. Thompson calls these flies grammars and lexicons. The commands input by the user are translated by the system, which then provides an automatic interactive system to generate the required interface in the following manner. After the database is loaded in, the interface generating system poses a series of questions to the user's technical expert. In response to these questions, the user or his expert must identify which tables in the database are to be used; which attributes of particular tables are key attributes; what the various connections are between the various tables in the database and what natural language connecting phrases will describe those relations.

U.S. Pat. No. 4,939,689 to Davis et. al. teaches a system for the creation of database structures and subsequent querying of those structures by use of a text driven outliner system. The Davis system uses another form of resident dictionary table, which is again previously defined. In Davis, the user inputs a textual outline which defines the format of the database. This outline is then used to create data entry screens to facilitate data entry.

After creating database information systems (and assuming the data to populate those systems has been input), the information system must be accurately queried. Efforts by others skilled in the present art teach two broad strategies to enable the naive user to form queries.

The first prior art solution to the query generation problem is through the use of natural language parsers. This methodology takes a query which is input in a desired natural language such as English or Japanese, and parses the query into its component parts. Each component of the query is then used to form the translation of the original natural language query into a database language query. Until the present invention, this was typically accomplished by some form of resident database or dictionary file which translated the parsed command words and phrases into their respective equivalents in the database design language.

European Patent Application EP 0522591A2, filed 10 Jul., 1992 by Takanashi et. al., teaches a system typical of this "parse and look up" strategy, whereby a natural language query is entered and parsed into its constituent parts. The parser uses both a resident grammar table and a resident terminology dictionary to translate the meaning of individual command words and phrases into the database design language. The difficulty with fully implementing this solution is the richness and power i.e., the size and variable structure, of most natural languages. Each possible word and many phrases must have a corresponding entry in the resident tables to make the system truly utile. If this is not done, the power of the natural language interface is substantially weakened in that a command will not be understood by the system.

The cost, both monetary and in computer overhead, of creating and maintaining a large, full-time resident natural language interface to any substantial information system is prohibitive. Furthermore, end users are still required to know the types of questions and keywords the parser and resident dictionary files will understand. This is because the resident table methodology does not fully account for the relationships between data objects and the constraints on those objects. For example, if a user wants to know Mr. Smith's age, it is not sufficient to ask "How old is Smith?" since Smith might be a person or the Smith Tower. Instead the user must type "How old is the person called Smith?". As a result, the learning curve for using natural language parsers is still extremely high.

The second solution to the query generation problem in the prior art is through the use of query tools. Query tools are based on the physical structures of the database and not the information contained therein. Information can be broadly categorized as a set of interacting conceptual objects, i.e. things you want to store—e.g., Person, Address, etc. Facts are relationships between objects—e.g. a Person lives at an address. When information is stored in a database, it is represented as a set of physical structures, e.g. tables. Absent considerable database expertise on the part of an end user, the physical representation of the data is invariably unintelligible to him or her. To enable, therefore, such a naive user to query data based on the physical structure it is stored in will require a significant training effort to ensure understanding of these physical structures.

In formulating a query using either a natural language parser or a physical structure query tool, one final issue remains. The user can never be sure that the query which is ultimately formed by either process is actually phrased correctly. When querying physical structures, absent significant training, the naive user doesn't understand the manner in which the data was stored. When using a natural language parser, the same problem arises due to the ambiguity inherent in that natural language. If, for instance, a user asked "How old is Smith?", and the computer answers "55", the answer may be for the person Smith, or the Smith Tower. This is reminiscent of the experience of a reporter who telegraphed Cary Grant's agent, asking about Mr. Grant's age. The reporter, sensitive to the cost per word of sending a telegraph, queried "HOW OLD CARY GRANT?". The actor, when the telegraph was inadvertently delivered to him, replied, again by telegraph, "OLD CARY GRANT JUST FINE". Clearly, unless the syntax of the query is correct, a naive user may retrieve an uncertain answer or an answer to an unintended query.

A common design feature of prior art CASE tools as previously discussed is the use of a pre-defined table or tables both to effect the translation of natural language inputs and to specify the exact nature of the data objects, facts and constraints as well as the interrelationships therebetween. As discussed, this methodology is costly, inefficient and not fully effective.

A further design feature of CASE tools currently in use for information system specification is their use of symbols instead of a natural language. A symbology-driven CASE tool set is at once imprecise and cumbersome, requiring several steps to perform the transformation from a chart of symbols to a database specification in a computer language.

There is therefore a need for apparatus that allows users to specify and create an information system using natural language or natural language-like commands, which will precisely specify the system's objects, facts and constraints without ambiguity or excessive overhead. This means should be capable of graphical depiction to define the interrelationships among the data elements in an unambiguous manner. The information used to create the system should be useable to define both the structure of the database itself as well as subsequent queries to that database once it is completed. There is a another need for a means for a naive user to be able to specify these queries to the system, again using natural language like commands which are not bound by previously entered definitions in a translation table. There is yet another need for a means for ensuring that any query which is created for the purpose of accessing the information system will, precisely and again without ambiguity, convey the user's intended question and return a correct, unambiguous answer.

DISCLOSURE OF INVENTION

The present invention provides a method and apparatus that allows users to:

1. Develop an information system description using a graphical user interface to a natural language-like computer language. One such language is FORML.

to the appropriate place over the ORM conceptual schema diagram of the Fact Compiler. The user then drops the text onto the diagram. The Fact Compiler validates the text entered and notifies the user of any errors encountered. During validation, the Fact Compiler first parses the text and creates an object list, a fact list and a constraint list in memory. Then the Fact Compiler iteratively compiles the text into the repository. The repository is essentially a "database of databases". Finally, the validated objects, facts and/or constraints are drawn in proper notation on the ORM conceptual schema diagram. At this point the information system specification may be considered complete.

After the information system has been created, the user may wish to check and/or edit the previously entered information. This is accomplished by using the Decompile function of the Fact Compiler. Decompile is essentially the reverse of the previously discussed Compile function, in that it takes an ORM conceptual schema diagram and returns a textual listing of the objects, facts and constraints entered in the repository. The user can use this listing to verify the information system specification or to edit the system as it exists.

Once the information system specification is complete, the conceptual schema depicted in the ORM representation of the information system is mapped to a relational database using RMAP. The RMAP process is fully described in McCormack et al (1993), which is incorporated by reference as if fully set forth herein. By way of example, for an example set of facts:

Person lives at address

Person has Phone Number

Person studies Subject

Subject is taught by Person if the relational database associated with an example fact tree is:

| Person_Table: | (Person, Address) |
| Phone_Table: | (Person, Phone Number) |
| Studies_Table: | (Person, Subject Studied) |
| Subject_Table: | (Subject, Teacher Person) |

The associated RMAP mappings would be:

| FACT | TABLE | FIRST NOUN COLUMN | SECOND NOUN COLUMN |
| --- | --- | --- | --- |
| Person lives at address | Person_Table | Person | Address |
| Person has Phone Number | Phone_table | Person | Phone Number |
| Person studies Subject | Studies_Table | Person | Subject Studies |
| Subject is taught by Person | Subject_Table | Person | Teacher Person |

2. Specify the fact tree for query generation.
3. Check queries for semantic correctness.
4. Generate queries to the database system.

Once it has been determined that an information system needs to be created, the Fact Compiler of the present invention is invoked. The Compile function of the Fact Compiler enables a user to type in text, using a natural language-like computer language. One such language is FORML. The text is typed in a window provided by the system, and may contain objects (also referred to herein as nouns), facts (also referred to herein as fact types or sentences) and/or constraints. Using a translation function called "Drag and Drop over Diagram" and a graphical user interface, the user then drags the text from the entry window The first step in query processing is specifying the fact-tree. In Fact-Tree Specification, the user selects a noun relevant to the query. For example, if the user wanted to find out the address, phone number, subjects studied, and teachers of Mr. Smith, they would start with the Person noun because the query is basically about a person. After choosing Person as the root of the query, they can select more information about the person—to find out their address etc. The only information they are able to select is the information contained in the facts about the person, i.e.

O A person lives at an address.

O A person has a phone number.

O A person studies a subject.

O A person teaches a subject.

This set of facts is all of the information possible about a particular person. The information is displayed conceptually and the user didn't need to know any special keywords or phrases. In this case the user would select the facts O A person lives at an address.

O A person has a phone number.

O A person studies a subject.

O A subject is taught by a person.

since that is what they want to know about Mr. Smith. This would build up the following fact-tree.

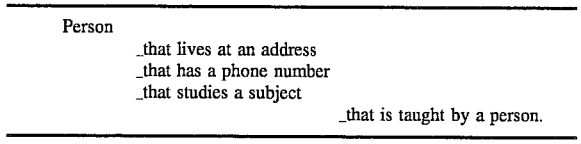

Finally, the user would restrict the person at the root of the tree to be equal to Mr. Smith, since this is the only person they are interested in.

The meaning of the final tree is: Show the person Mr. Smith, the address that he lives at, the phone numbers that he has, the subject that he studies, and for the subjects he studies, show the people that teach those subject.

After generating the fact-tree, the user verifies that the fact-tree is correct using the Tree Interpreter of the present invention. Doing so will preclude the possibility of an ambiguous query being generated. In use, the Tree Interpreter algorithm constructs a natural language description of the fact-tree. This algorithm is a recursive depth-first search function which is described in the following best mode section. This interpretation allows the user to verify that the question he or she is asking will retrieve the information desired.

Once the user has specified the fact-tree and checked it using the Tree Interpreter, all that remains to do is generate the relational query itself. The algorithm to do this is again recursive on fact-tree nodes, and is detailed in the following section detailing the best mode of carrying out the invention.

BRIEF DESCRIPTION OF THE DRAWINGS

The various features and advantages of the present invention may be more readily understood with reference to the following detailed description of the preferred embodiments taken in conjunction with the accompanying drawings, wherein like reference characters designate like elements.

BEST MODE OF CARRYING OUT THE INVENTION

Figure 1:
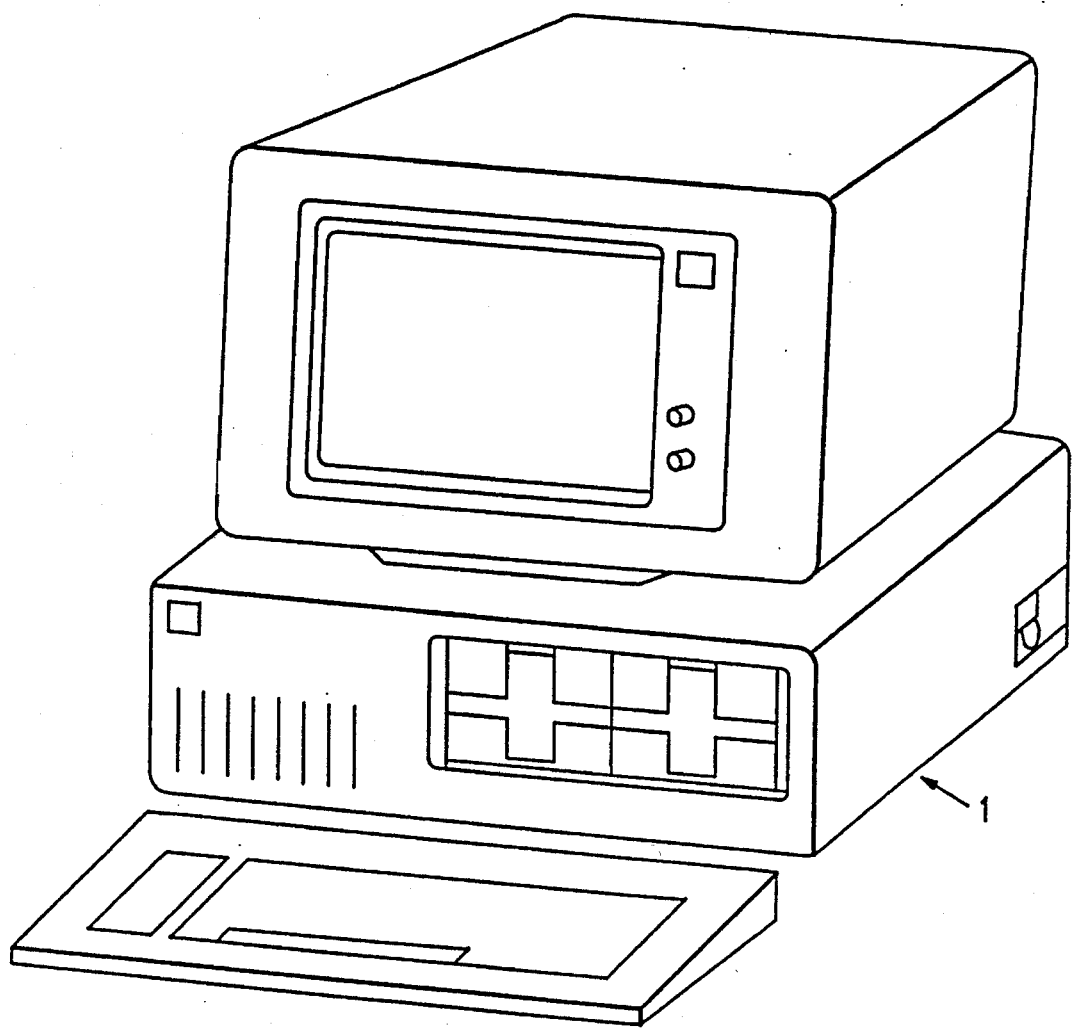
FIG. 1 is a diagram of the external view of a digital, programmable, general purpose computer configured for operation of the present invention.

The preferred embodiment of the present invention incorporates computer system 1 configured as shown in FIG. 1. Computer system 1 is a programmable digital computer. The invention is executable on an IBM compatible computer having an Intel 80386 or higher chip set, operating under the MS-DOS operating system, version 5.0 or higher. A minimum or 6 megabytes of available RAM is required for execution, as is a minimum of 6 megabytes of available hard disk storage space. These computers typically include a CPU, main storage, I/O resources, and a user interface, including a manually operated keyboard and mouse. The present invention also requires a graphical user interface program: Microsoft Windows is one well known example.

The present invention was programmed on an IBM compatible computer having an Intel 80486 chip set, running Microsoft MS-DOS operating system, version 5.0. Microsoft Windows Version 3.1 was installed to provide the required graphical user interface. Finally, the system whose description follows was programmed in the Borland C language.

Figure 2:
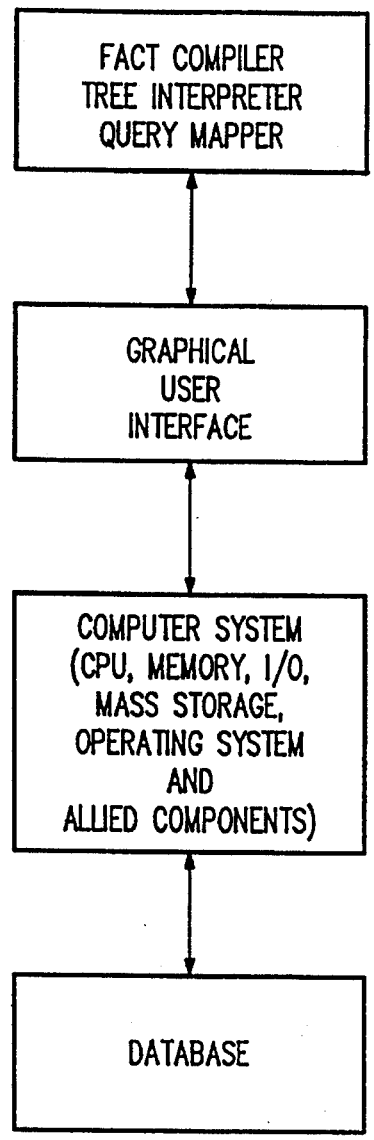
FIG. 2 is a block diagram of the computer of FIG. 1 configured with the present invention.

FIG. 2 depicts the bus structure of the general purpose programmable computer of FIG. 1, with the present invention implemented thereon.

Figure 3:
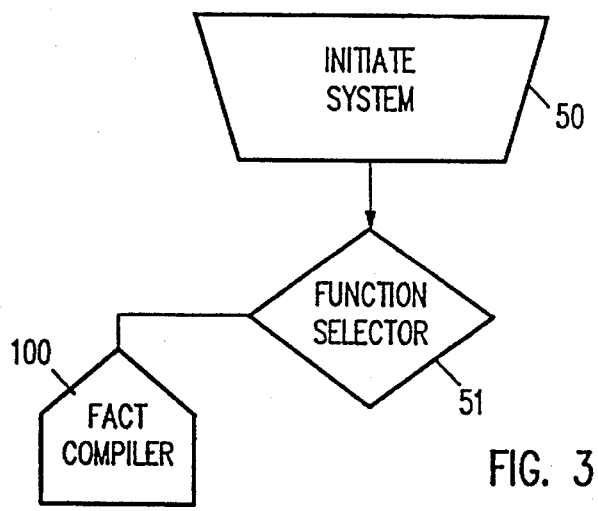
FIG. 3 is a flow chart illustrating the initial selection menu of the present invention, after selecting the Fact Compiler of the present invention.

Referring now to FIG. 3, a user initiates the system at manual input 50 and selects the desired function at function selection 51.

The present invention provides a method and apparatus that allows users to:

1. Develop an information system description using a graphical user interface to a natural language-like computer language. One such language is FORML.

information system specification or to edit the system as it exists.

Once the information system Specification is complete, the conceptual schema depicted in the ORM representation of the information system is mapped to a relational database using RMAP. The RMAP process is fully described in McCormack et al (1993), which is incorporated by reference as if fully set forth herein. By way of example, for an example set of facts:

Person lives at address

Person has Phone Number

Person studies Subject

Subject is taught by Person if the relational database associated with an example fact tree is:

| Person_Table: | (Person, Address) |
| Phone_Table: | (Person, Phone Number) |
| Studies_Table: | (Person, Subject Studied) |
| Subject_Table: | (Subject, Teacher Person) |

The associated RMAP mappings would be:

| FACT | TABLE | FIRST NOUN COLUMN | SECOND NOUN COLUMN |
|---|---|---|---|
| Person lives at address | Person_Table | Person | Address |
| Person has Phone Number | Phone_table | Person | Phone Number |
| Person studies Subject | Studies_Table | Person | Subject Studies |
| Subject is taught by Person | Subject_Table | Person | Teacher Person, if the relational database associated with an example fact tree is: |

2. Specify the fact tree for query generation.

3. Check queries for semantic correctness.

4. Generate queries to the database system.

Once it has been determined that an information system needs to be created, the Fact Compiler of the present invention is invoked. The Compile function of the Fact Compiler enables a user to type in text, using a natural language-like computer language. One such language is FORML. The text is typed in a window provided by the system, and may contain objects, facts and/or constraints. Using a translation function called "Drag and Drop over Diagram" and a graphical user interface, the user then drags the text from the entry window to the appropriate place over the ORM conceptual schema diagram of the Fact Compiler. The user then drops the text onto the diagram. The Fact Compiler validates the text entered and notifies the user of any errors encountered. During validation, the Fact Compiler first parses the text and creates an object list, a fact list and a constraint list in memory. Then the Fact Compiler iteratively compiles the text into the repository. The repository is essentially a "database of databases". Finally, the validated objects, facts and/or constraints are drawn in proper notation on the ORM conceptual schema diagram. At this point the information system specification may be considered complete.

After the information system has been created, the user may wish to check and/or edit the previously entered information. This is accomplished by using the Decompile function of the Fact Compiler. Decompile is essentially the reverse of the previously discussed Compile function, in that it takes an ORM conceptual schema diagram and returns a textual listing of the objects, facts and constraints entered in the repository. The user can use this listing to verify the The first step in query processing is specifying the fact-tree. In Fact-Tree Specification, the user selects a noun relevant to the query. For example, if the user wanted to find out the address, phone number, subjects studied, and teachers of Mr. Smith, they would start with the Person noun because the query is basically about a person. After choosing Person as the root of the query, they can select more information about the person—to find out their address etc. The only information they are able to select is the information contained in the facts about the person, i.e.

O A person lives at an address.

O A person has a phone number.

O A person studies a subject.

O A person teaches a subject.

This set of facts is all of the information possible about a particular person. The information is displayed conceptually and the user didn't need to know any special keywords or phrases. In this case the user would select the facts O A person lives at an address.

O A person has a phone number.

O A person studies a subject.

O A subject is taught by a person.

since that is what they want to know about Mr. Smith.

This would build up the following fact-tree.

```
Person
    _that lives at an address
    _that has a phone number
    _that studies a subject
            _that is taught by a person.
```

Finally, the user would restrict the person at the root of the tree to be equal to Mr. Smith, since this is the only person they are interested in.

The meaning of the final tree is: Show the person Mr. Smith, the address that he lives at, the phone numbers that he has, the subject that he studies, and for the subjects he studies, show the people that teach those subject.

After generating the fact-tree, the user verifies that the fact-tree is correct using the Tree Interpreter of the present invention. Doing so will preclude the possibility of an ambiguous query being generated. In use, the Tree Interpreter algorithm constructs a natural language description of the fact-tree. This algorithm is a recursive depth-first search function which can be summarized as follows:

```
function: Interpret_Tree (fact-tree_node) Il Interpret_Tree operates on a node of
          the fact-tree
    begin
        If the node is the root of the tree then
            noun is the noun in the node                    e.g. Person
            Print 'For all noun(s)'                         e.g. For all Person(s)
            if the node has a restriction then              e.g. is equal to Mr. Smith
                print "(where noun restriction)"            e.g. (where Person = Mr.Smith)
            Print "show:" and move on to a new line
        otherwise
            noun is the noun in the node                    e.g. Address
            parent-noun is the noun in the node's parent    e.g. Person
            phrase is the phrase in the noun                e.g. lives at
            Print "the noun(s) that the parent-noun phrase" e.g. the Address(es)
                                                                 that the person
                                                                 lives at
            if the node has a restriction then              e.g. is equal to
                                                                 Seattle
                print "(where noun restriction)"            e.g. (where address
                                                                 = Seattle)
            if the node has any children then
                print ", and for those noun(s) show:"
                move on to a new line
            for all children of the node do
                call Interpret_Tree on the child-node
    end
```

The result of Interpret_Tree on the example fact-tree would be

For all Person(s) (where Person=Mr. Smith) show:
the Address that the Person lives at
he Phone Number that the Person has
the Subjects that the Person studies,
and for those subjects show the Person(s) that the Subject is taught by.

This interpretation allows the user to verify that the question he or she is asking will retrieve the information desired.

Once the user has specified the fact-tree and checked it using the tree interpreter, all that remains to do is generate the relational query itself. The algorithm to do this is again recursive on fact-tree nodes.

function Create_Query (fact-tree_node)
begin
node is the node being mapped by this call to the function
childi . . . childn are the children of node
sentence1, . . . sentencen. are the respective sentences for childi . . . childn each sentence i, (i=1 . . . n) has a mapping' associated with it. The mapping corresponds to the relational structure used to represent the sentence and contains the table that the sentence was mapped to, the column for the first noun and the column for the second noun. For example, the sentence Person lives at Address maps to the Person table, with noun1 (person) being column 1, and noun2 (address) being column 2.

Join all of the mappings for sentences 1..n together using outer joins based on the noun in node and the respective positions of that noun in sentences 1 to n. Form a query, including restriction when required.

An SQL query representative of this applied to the example fact-tree would be:

select: Person. Person, Phone Number, Subject from Person, Person has Phone_Number, Person_studies_Subject Outer join Person.Person=Person has Phone_Number.Person Outer join Person.Person=Person_studies_Subject.Person where Person.Person='Mr. Smith' . . .

If any childi i=1..n have children, apply Create_Query to child and use an outer join to include the result into the existing query. In the example fact-tree, this would result in Create_Query being executed on the Subject node of the Person that studies Subject branch and would result in the query:

select Person.Person, Phone Number, Person_studies_Subject. Subject Subject.Person from Person, Person_has_Phone Number, Person_studies_Subject, Subject Outer join Person.Person=Person_has_Phone_Number.Person Outer join Person.Person=Person_studies_Subject.Person Outer join Person_studies_Subject.Subject=Subject.Subject where Person.Person='Mr. Smith . . .

Note that SQL is used as a notational convenience and its use has no bearing on the theory behind the algorithm. It is a particular feature of the present invention that any relational language could have been used. The advantages of the Fact Compiler, Query Mapper and Tree Interpreter algorithms of the present invention are that they substantially reduce the number of concepts and amount of training required for a naive end-user to express meaningful queries in a relational database. The algorithm set of the present invention allows users to form conceptual queries without having to know keywords and physical structures. Also, the algorithms of the present invention provide a generated natural language description of the query to assure that the query is correct in syntax. These advantages are illustrated by contrasting the previously described example with the same example expressed in the state of the art natural language and SQL implementations.

To express the query in natural language, the user would need to construct and type in the query:

Show me the person called Mr. Smith, his Address, his Phone Number, the subjects he studies, and for those subjects show people who teach them The distinct pieces of information required to phrase this query are:

1. An overall knowledge of how to express the query (having to include keywords like person, etc.)
2. The knowledge that you could ask for Address, Phone Numbers, Subjects, etc . . .

Fact Compiler

Figure 4:
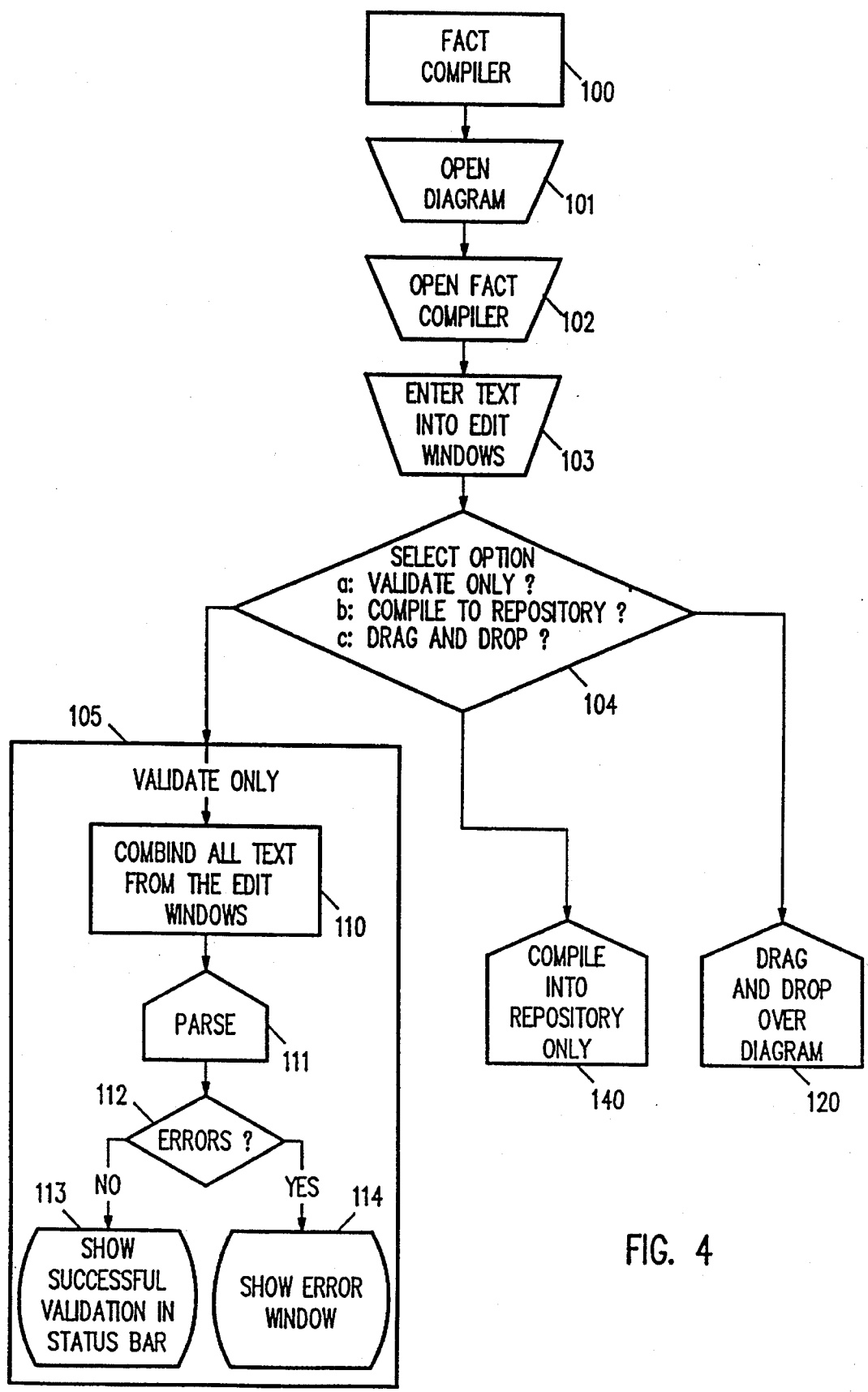
FIG. 4 is a flow chart illustrating the Fact Compiler of the present invention, including it's three main functions.

The fact compiler of the present invention is selected at 100. The fact tree of the present invention is selected at 300. As explained above, a Fact Compiler is provided by the present invention, a detailed description of which follows. Referring now to FIG. 4, after selecting fact compiler 100, the user opens a diagram which represents one level of the information system to be modelled. After opening the fact compiler diagram, the user types in a factual sentence, an object type, or a constraint, using a natural language-like computer language. One such language is FORML. An example of such an input is "the INSTRUCTOR with the ID "100" is qualified to teach the SUBJECT with the name "database design" at the SUBJECT LEVEL 300". At this point, the user may select one of three options: validate the input using Validate Only function 105; compile the information only into the repository 140; or to drag and drop the fact over the diagram at function 120.

Referring now to Validate. Only function 105 of FIG. 4 of the present invention, after all text has been combined from the edit windows at 110, it is parsed into its component words using function 111. An error checker at 112 determines if there are errors in the text which is input. If there are no errors, the system indicates successful validation at 113. If error checker 112 determines that there are errors in the textual input, the errors will be shown at error window 114.

Figure 5:
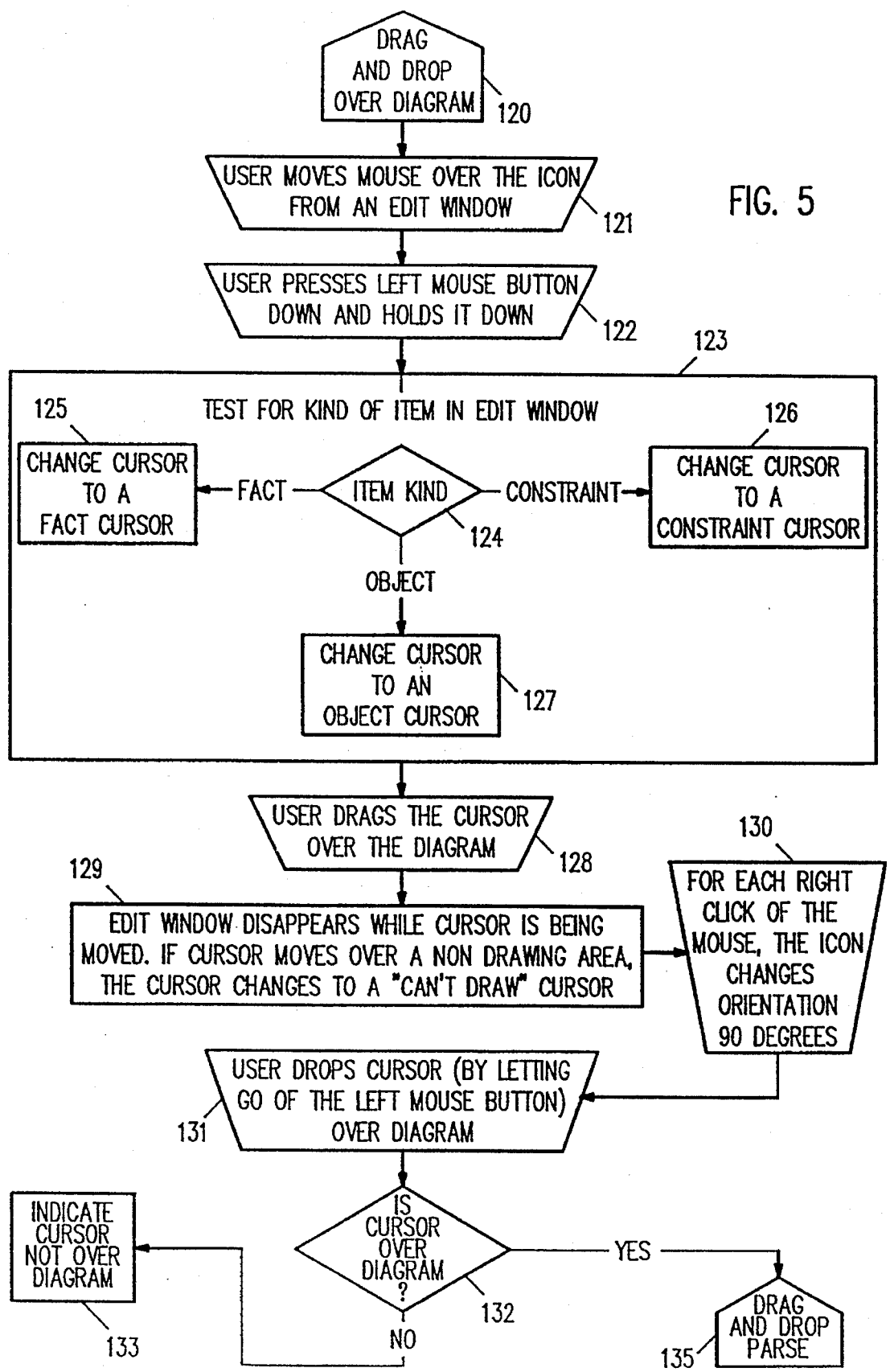
FIG. 5 is a flow chart illustrating the Drag and Drop over Diagram function of the Fact Compiler of the present invention.

Drag and Drop over Diagram function 120, is detailed in FIG. 5. After the user selects Drag and Drop over Diagram at 120, the user utilizing a mouse moves a pointer over the icon from the edit window at 121. The user presses the left mouse button down and holds it down at 122. The system will test for the type of item which was input in the edit window at 123. Item kind selector 124 will change the nature of the cursor depending upon the type of information input in the edit window. If the data input is a fact, the cursor will change to a fact cursor at 125. If the data input is a constraint, the cursor will be changed to a constraint cursor at 126. If the data input is an object, the cursor will change to an object cursor at 127. The user drags the modified cursor over the diagram at 128. The edit window will disappear while the cursor is being moved. If the cursor moves over a non-drawing area the cursor change to a "Can't Draw" cursor. In the event the user needs to reorient the direction of the data which is input, the right mouse button is used. For each click of the right mouse button, the icon changes its orientation 90° at 130. When the user releases the left mouse button at 131, the cursor will drop the data over the diagram. Cursor checker 132 determines if the cursor is actually over the diagram or not. If it is, Drag and Drop Parse function 135 is invoked. If not, an indication is given the user that the cursor is not in the diagram.

Figure 6:
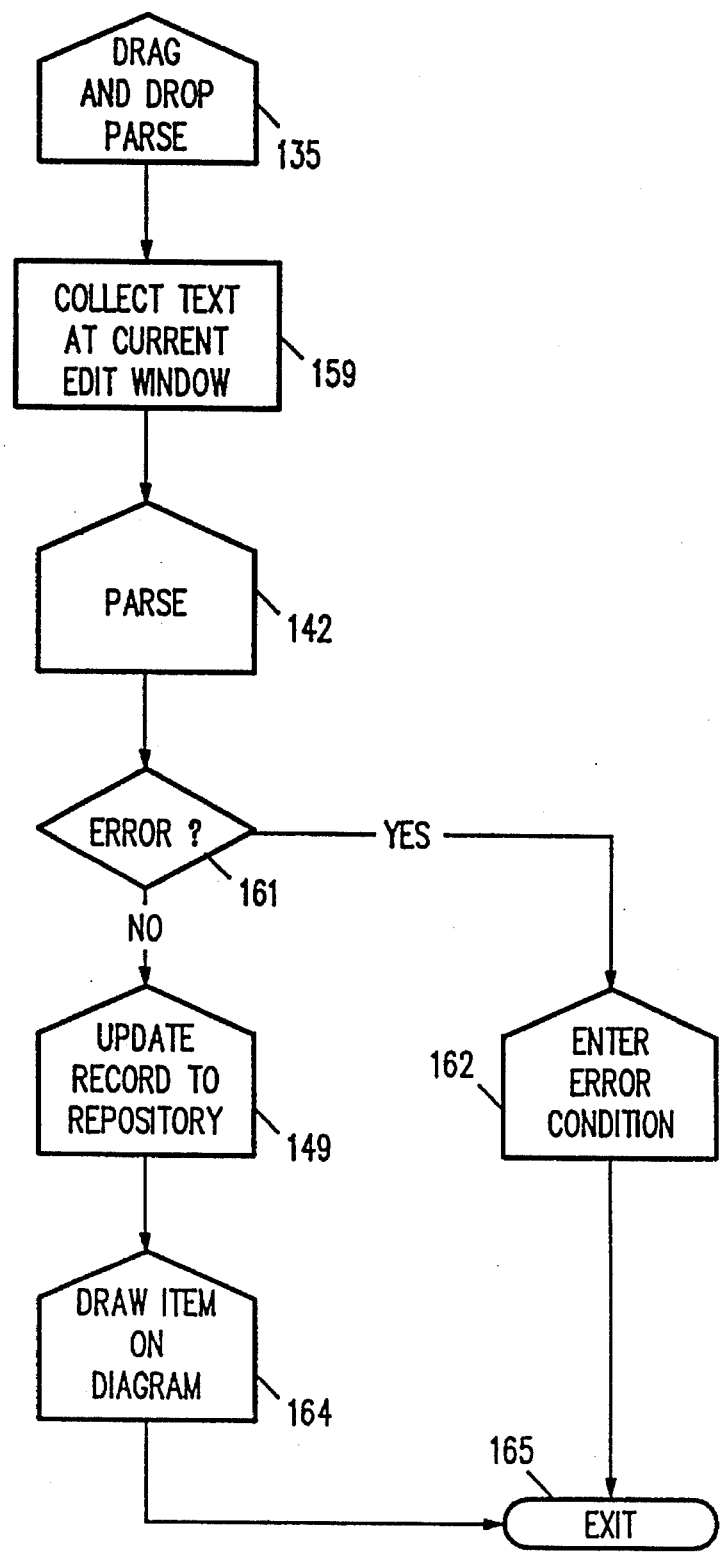
FIG. 6 is a flow chart of the Drag and Drop Parse function invoked by the Drag and Drop over Diagram function.

Drag and Drop Parse function 135 is detailed in FIG. 6. After collecting text at the current edit window, the text is parsed using Parse function 142. After parsing an error checker 161 determines if an error has been made in the textual input. If no error has been made, the record is updated to the repository using the Update Record to Repository function 149. After the record has been updated to the repository, the item is drawn on the diagram using Draw Item on Diagram function 164. At error checker 161, should an error condition be determined to exist, Enter Error Condition function 162 is invoked and function 135 exited at 165.

Referring again to FIG. 4, function 140 gives the user the option of compiling the input into the repository only. Function 140 is detailed in FIG. 7. After selecting function 140, Compiling into Repository Only, the system combines all text from the edit windows at 141 and parses the input data using Parse function 142. Error checker 143 determines if an error has been made in the textual input. If errors have been made, they are shown at error window 145. In the event no errors were incurred, successful compilation is shown in the status bar at 144. An iterative process is detailed at 146. Each of the lists generated, the object list, fact list and constraint list, is searched record by record. Each record is retrieved from it's respective list at 147 and its status tested at 148. In the event the record has been changed, function 149, which updates the record to the repository, is invoked. In the event the record has not been changed, the list pointer is incremented at 150 and a new record is retrieved from the list. In the event the record is new, function 149 is again invoked after which the record type is tested at 152. If the new record is an object, function 152, which allocates a new object, is invoked. In the event the new record is a fact, a new fact is allocated using function 154. If the new record type is a constraint, a new constraint is allocated at 155. Following any of these allocations, the list pointer is again incremented at 150.

Figure 7:
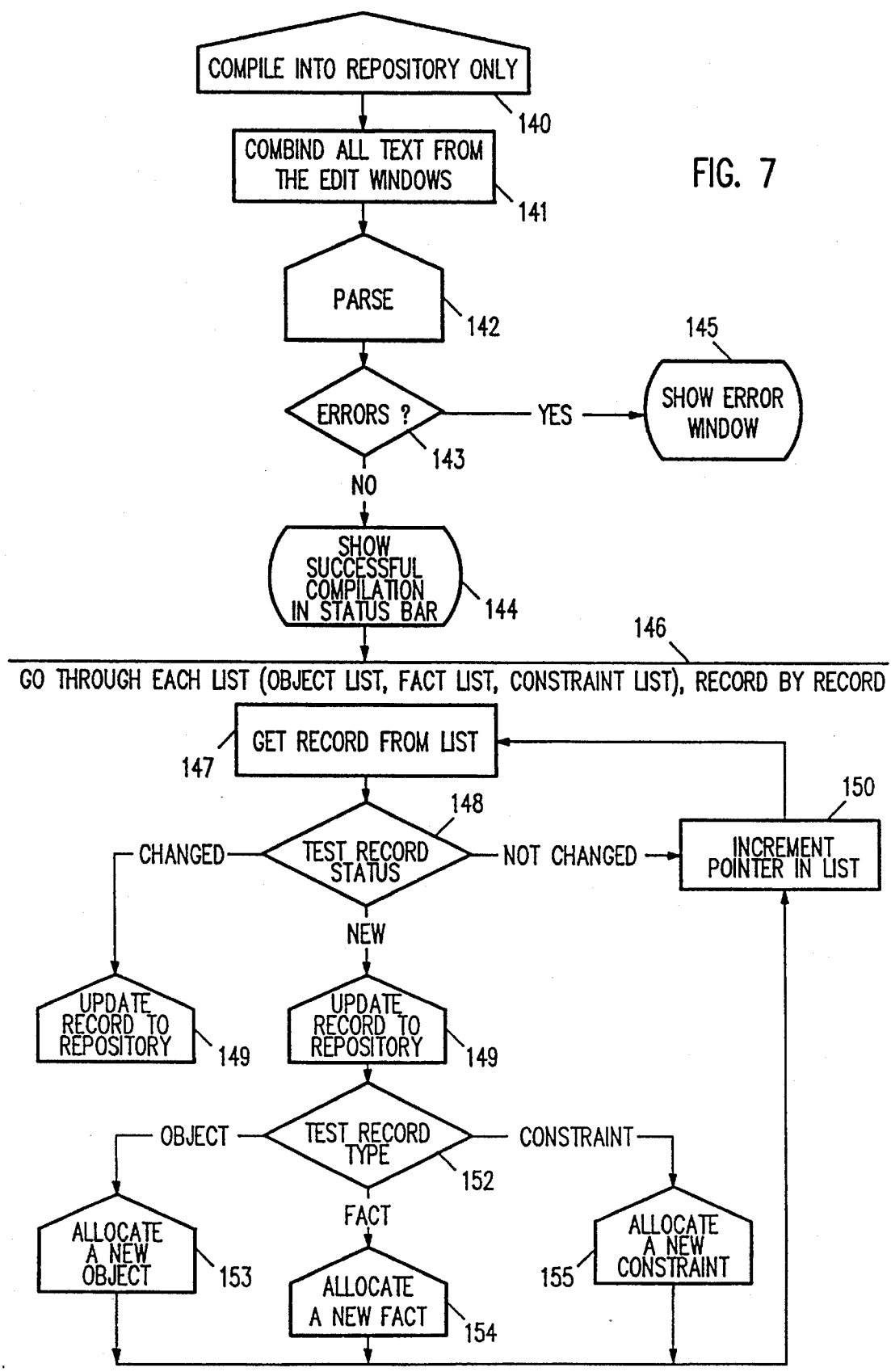
FIG. 7 is a flow chart of the Compile into Repository Only function invoked by the Fact Compiler.
Figure 8:
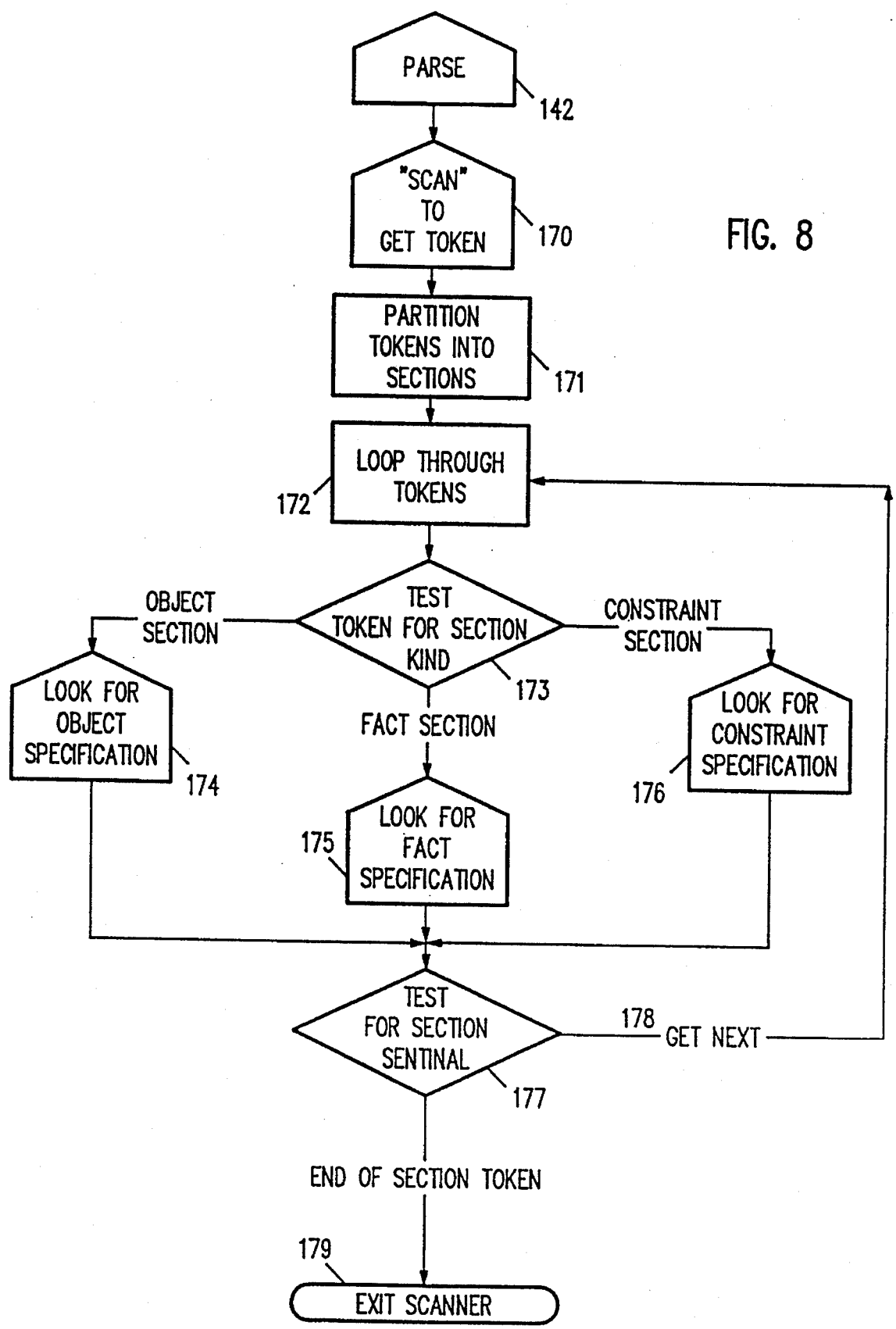
FIG. 8 is a flow chart of the Parse function invoked by the Compile into Repository Only function.

Parse function 142 of FIGS. 6 and 7 is detailed at FIG. 8. After Parse function 142 is invoked, it invokes Scan function 170 to retrieve a token. After the token is retrieved, it is partitioned into sections at 171. An iterative loop through each of the tokens is set up at 172. Each token is tested for its type at 173. In the event the section is an object, function 174, which looks for object specifications, is invoked. In the event the section is a fact, function 175, which looks for fact specifications is invoked. In the event the section being tested is a constraint, function 176 is invoked which looks for constraint specifications. After either functions 174, 175 or 176 have been invoked, a test is made to determine if the section tested is the terminal section. If not, the next section is subjected to the same test. In the event the section is a terminal section, Parse function 142 is exited at 179.

Figure 9:
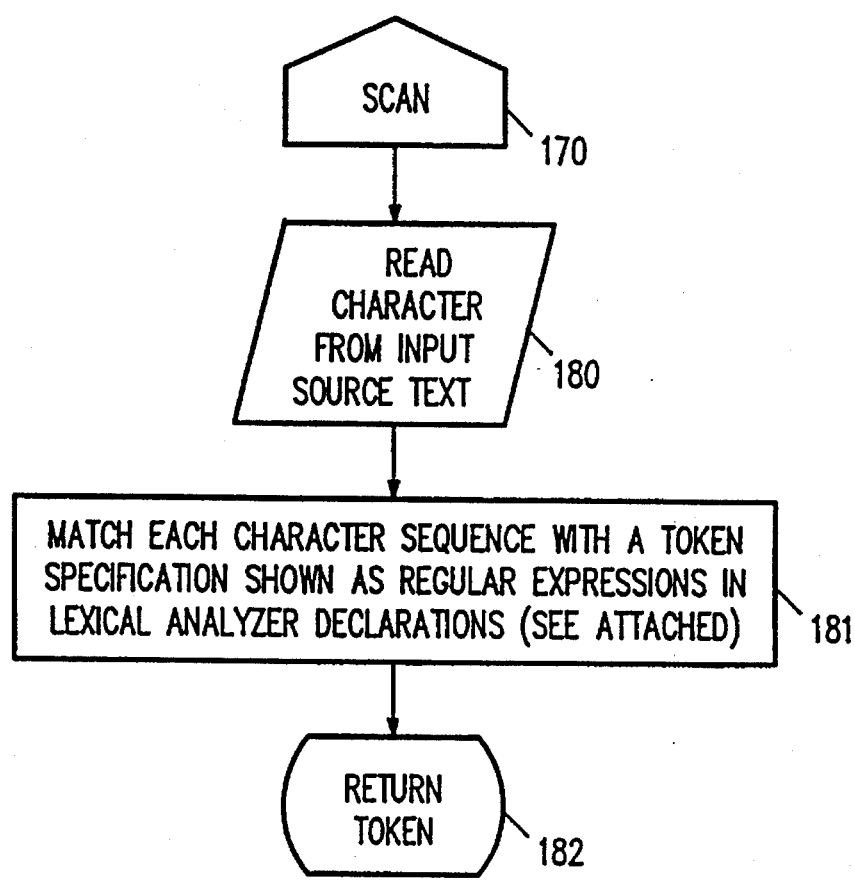
FIG. 9 is a flow chart of the Scan function invoked by the Parse function.

Scan function 170 of FIG. 8 is detailed at FIG. 9. After Parse function 142 invokes Scan function 170, it reads characters from the input source text at 180. At 181, the function matches each. character sequence with a token specification shown as regular expressions in the Lexical Analyzer Declarations at 181, after which the token is returned at 182.

Figure 10:
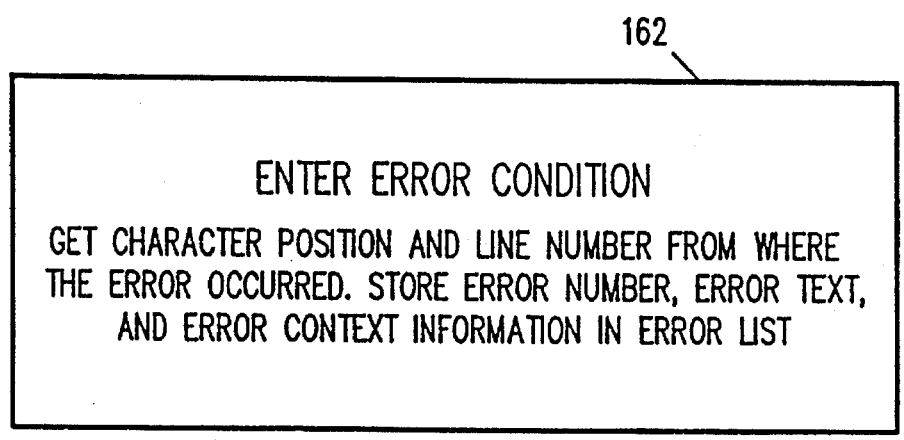
FIG. 10 is a table indicating the procedure for entering an error condition according to the present invention.

Function 162, Enter Error Condition which was previously invoked at FIG. 6, is detailed at FIG. 10. For each error encountered, the system will retrieve the character position and line number where the error occurred. This function will then store the error number, error text and error context information in an error list.

Figure 11:
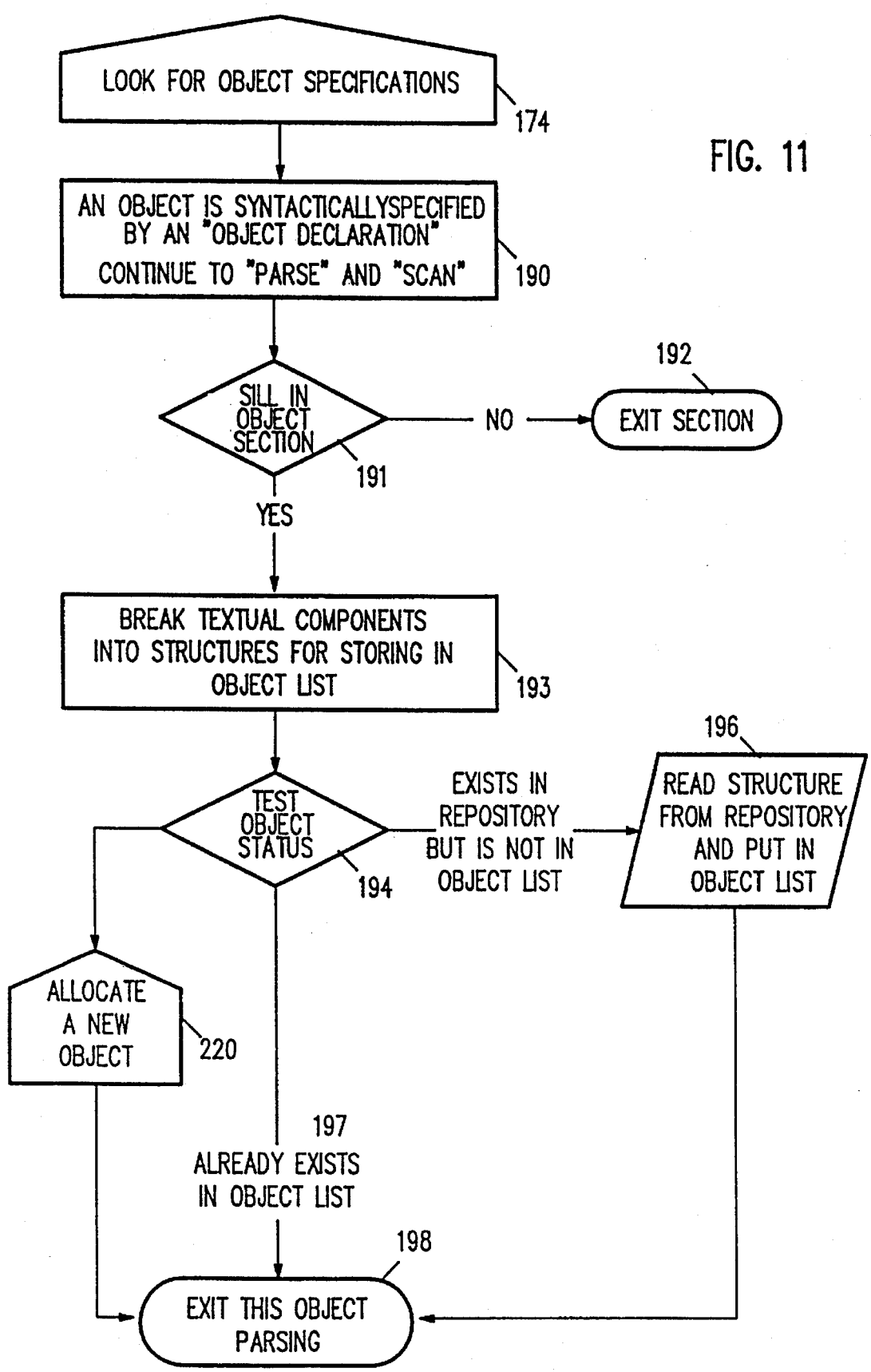
FIG. 11 is a flow chart illustrating the Look for Object Specifications function invoked by the Parse function.

Referring again to FIG. 8, function 174, Look for object Specification, is detailed at FIG. 11. When function 174 is invoked, the object is syntactically specified by any "Object Declaration" at 190. The function continues to "parse" and "scan". A determination is made at 191 as to whether it is still an object section. If not, the function exits at 192. If the object is still in the object section, it breaks the textual components into structures for storing in the object list at 193. At 194, the object status is tested. If it is a new object, function 220 which allocates a new object, is invoked. If the object already exists in an object list, function 174 is exited at 198. If the object exists in the repository but it is not in the object list, the system reads the structure at 196 from the repository and puts it in the object list. After either function 196 or 220 is invoked, the function is again exited at 198.

Figure 12:
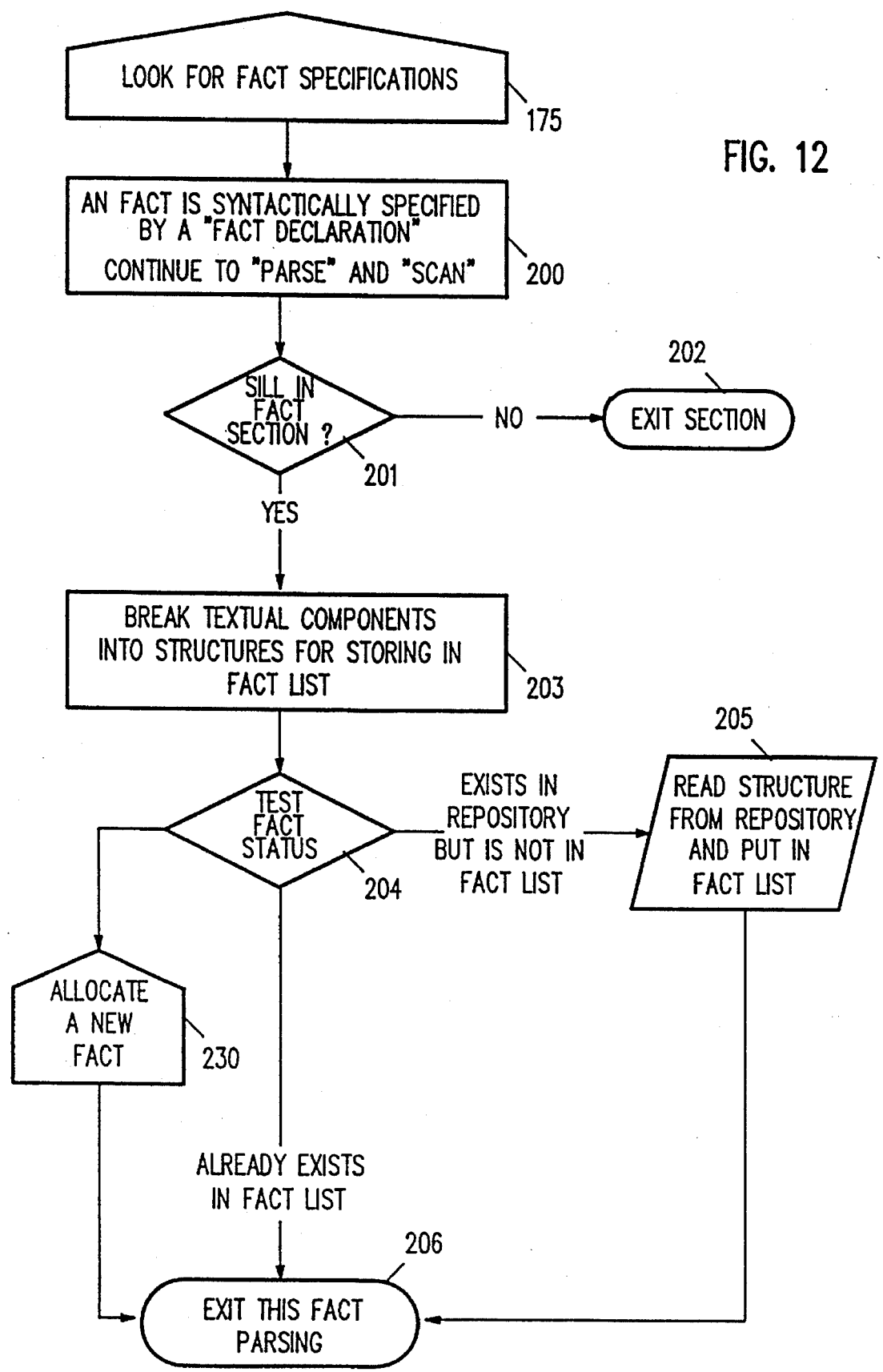
FIG. 12 is a flow chart representing the Look for Fact Specifications function invoked by the Parse function.

Function 175, Look for Fact Specification, previously invoked at FIG. 8, is derailed in FIG. 12. After function 175 is invoked, the fact is syntactically specified by a "fact declaration". The system continues to "parse" and "scan". A determination is made at 201 as to whether the fact is still in the fact section. If not, function 175 is exited at 202. If it is still in the fact section, the system breaks the textual components into structures for storing in a fact list at 203 after which the fact status is tested at 204. If the fact is a new fact, function 230 is invoked, which allocates a new fact after which fact parsing is exited at 206. If the fact already exists in a fact list, the function 175 again exits at 206. If the fact exists in the repository but is not in the fact list, the system reads the structure at 205 from the repository and puts it in the fact list, after which function 175 exits once again at 206.

Figure 13:
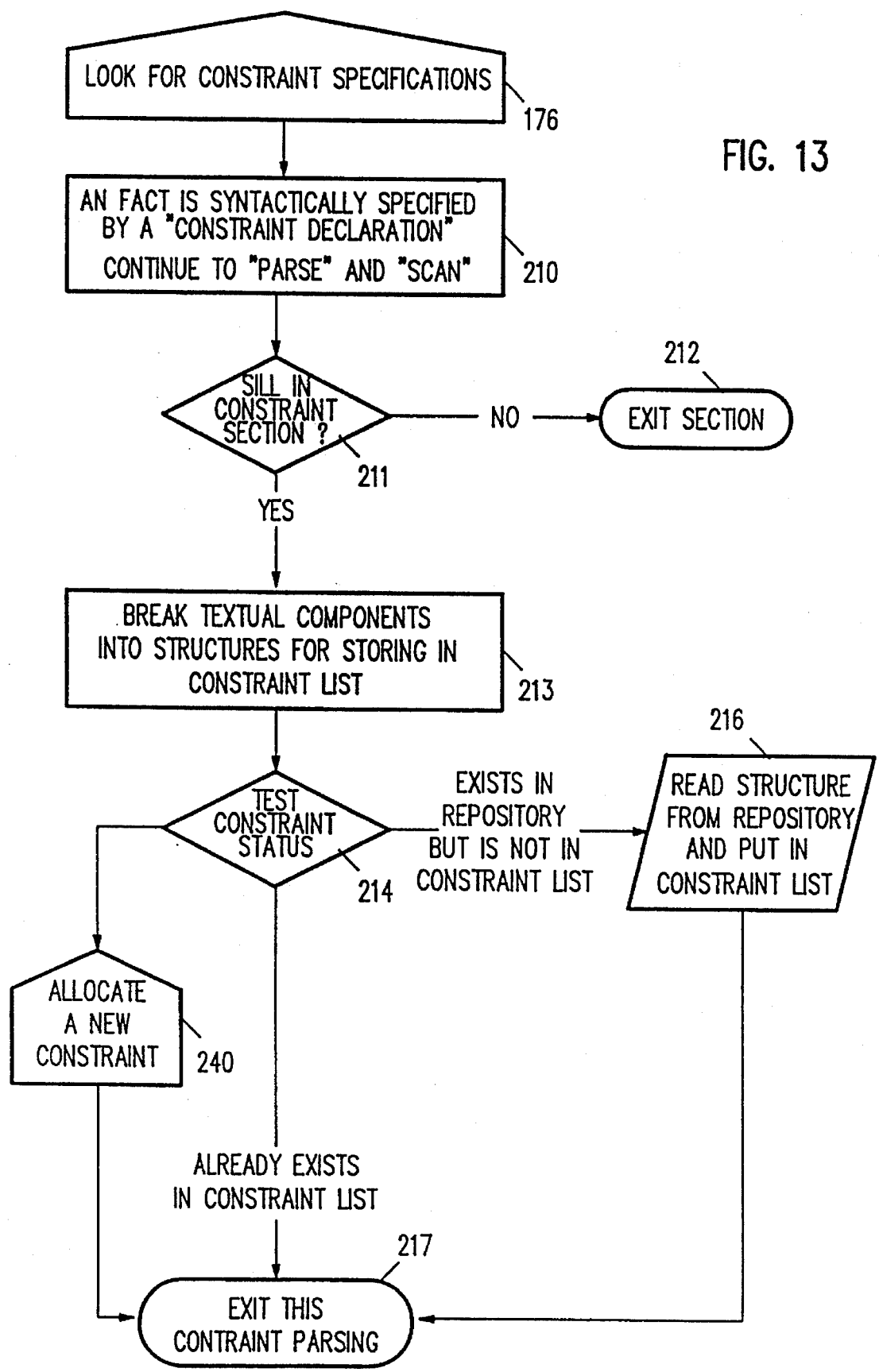
FIG. 13 is a flow chart representing the Look for Constraint Specifications function invoked by the Parse function.

Function 176, also previously invoked at FIG. 8, is derailed at FIG. 13. When function 176 is invoked to look for constraint specifications, a constraint is syntactically specified by a "constraint declaration" at 210. The system continues to "parse" and "scan". At 211 a determination is made if the constraint is still in the constraint section. If not, function 176 is exited at 212. If the constraint is still in the constraint section, the system breaks the textural components into structures for storing in the constraint list at 213. After which the constraint status is tested at 214. If a new constraint, function 240 is invoked, which allocates a new constraint. If the constraint already exists in the constraint list, function 176 is exited at 217. If the constraint exists in the repository but it is not in the constraint list, the function reads the structure from the repository and puts it in the constraint list at 216. After either function 240 or process 216 is accomplished, function 176 exits at 217.

Figure 14:
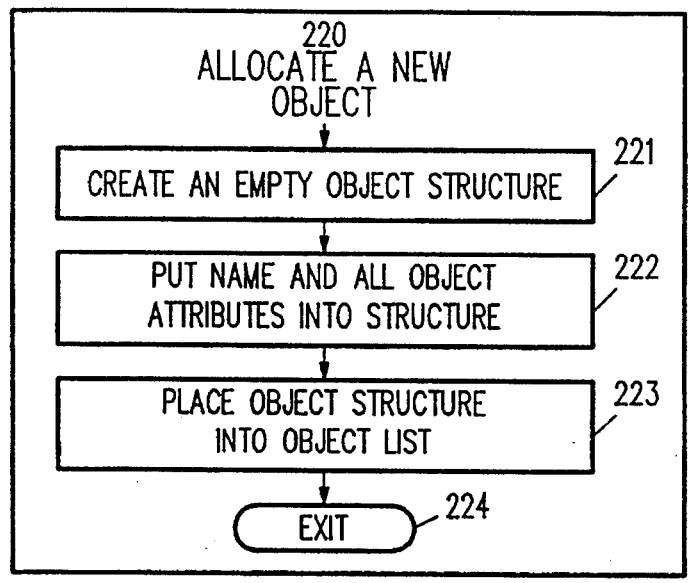
FIG. 14 is a flow chart illustrating the Allocate a New Object function invoked by the Look for Object Specifications function.

Function 220, previously invoked in FIG. 11, is detailed in FIG. 14. Function 220 creates an empty object structure at 221, enters the name and all object attributes into the structure at 222, places the object structure in the object list at 223, and exits at 224.

Figure 15:
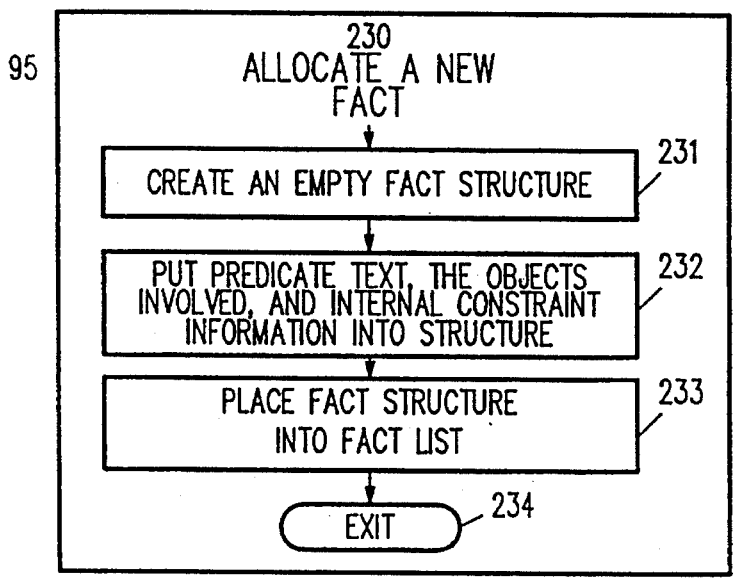
FIG. 15 is a flow chart illustrating the Allocate a New Fact function invoked by the Look for Fact Specifications function.

Function 230, previously invoked in FIG. 12, is detailed in FIG. 15. Function 230 creates an empty fact structure at 231. At 232 the function puts the predicate text, the objects involved and internal constraint information into the structure. At 233, the function places the fact structure into the fact list and exits at 234.

Figure 16:
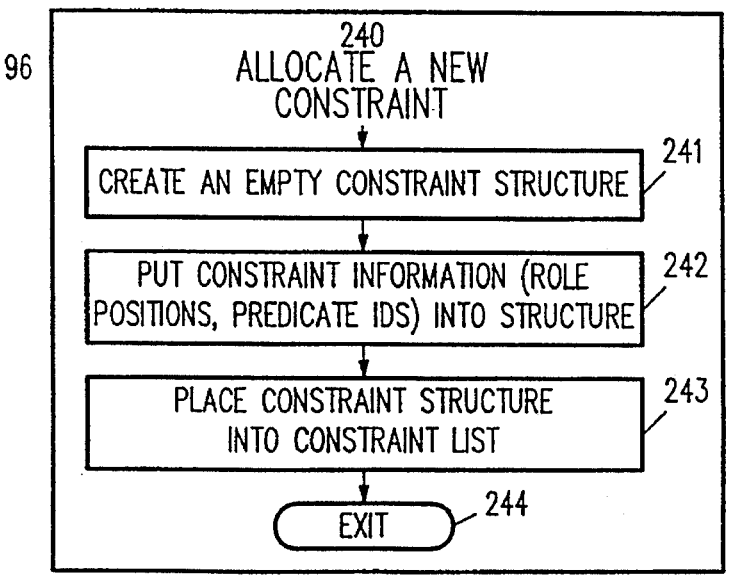
FIG. 16 is a flow chart illustrating the Allocate a New Constraint function invoked by the Look for Constraint Specifications function.

Function 240, previously invoked at FIG. 13, is detailed in FIG. 16. Function 240 allocates a new constraint as follows: it creates an empty constraint structure at 241. At 242 it puts the constraint information (role positions, predicate IDs) into the structure. At 243 the function places the constraint structure into the constraint list and exits at 244.

Figure 17:
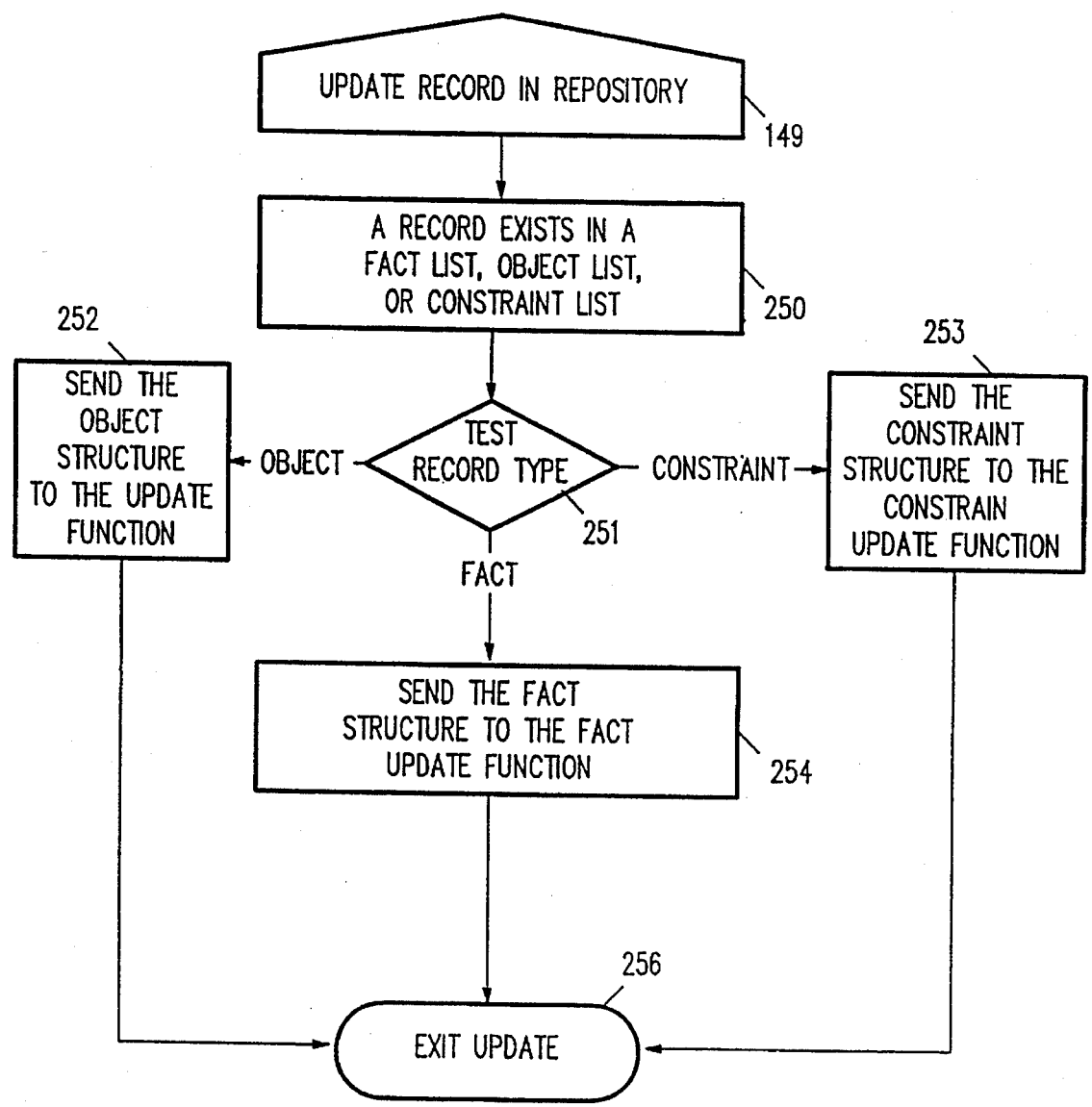
FIG. 17 is a flow chart representing the Update Record in Repository function invoked by both the Drag and Drop Parse and Compile into Repository Only functions.

Function 149, previously invoked in both FIGS. 7 and 8, is detailed in FIG. 17. After function 149 is invoked, an updated record exists in a fact list, an object list or a constraint list, as shown at 250. At 251, the record type is tested. If the record is an object, the object structure is sent the object update function at 252. If the record is a fact, the fact structure is sent to the fact update function at 254 and if a constraint structure is sent to a constraint update function at 253. After any of the aforementioned update functions is accomplished, function 149 is exited at 256.

Fact Tree Formation

Figure 18:
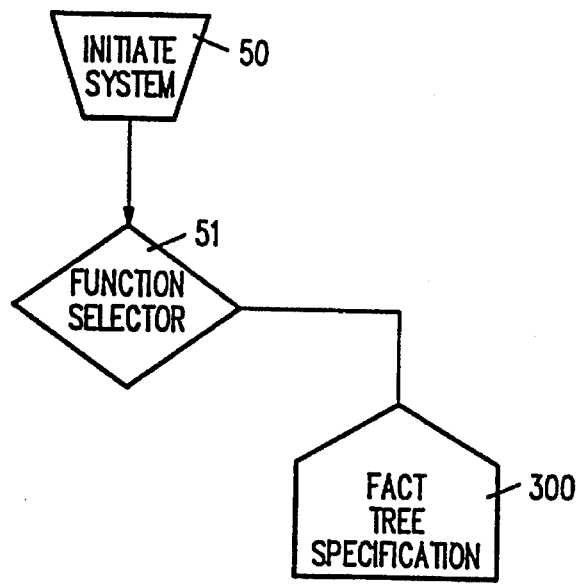
FIG. 18 is a flow chart illustrating the initial selection menu of the present invention, after selecting Fact Tree Specification according to the present invention.
Figure 19:
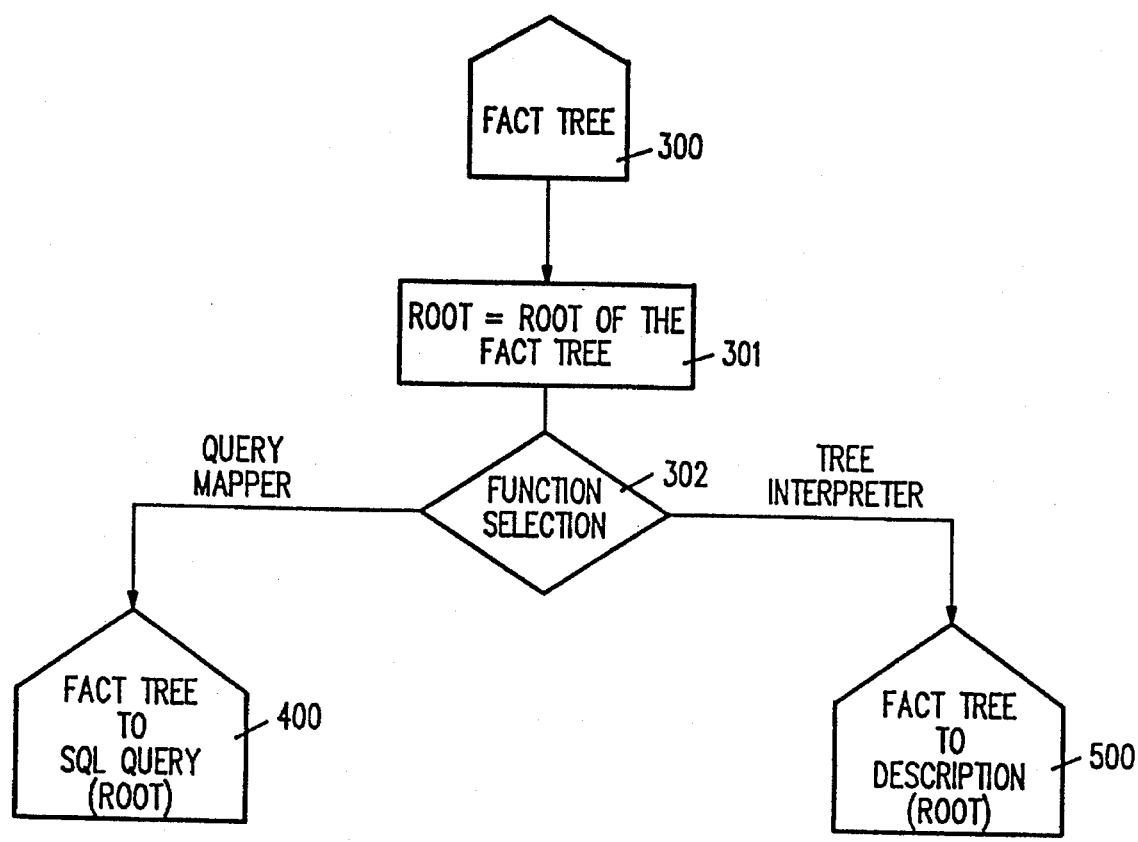
FIG. 19 is a flow chart illustrating the Fact Tree Formation function and selection of either the Query Mapper or Tree Interpreter functions of the present invention.

Referring to FIG. 18, the second option possible from function selection 51 is initiation of Fact Tree Specification 300, which is detailed at FIG. 19.

Referring to FIG. 19, the fact-tree is formed at 300. An example of a fact tree is:

---

-- Person (= Mr Smith) . . . . . . . . . . . . . . . .restriction
    |-- that person lives at an address
    |-- that has a phone number . . . . . . . . . . . . . . .noun
    |-- that studies a subject
            |-- that is taught by a Person
                i . . . . . . phrase"

---

Each node in the fact tree has a noun (e.g. Person).

Each node in the fact tree may have a restriction (e.g.=Mr Smith).

Each non-root node in the fact tree (all but the very top node) has a phrase (e.g. is taught by).

The root of the tree is then assigned to the variable Root at 301. In this case, the shaded node (Person) is assigned to Root.

If the fact tree is to be mapped to an SQL query, Root is passed as the parameter to the function Fact__Tree__To__ SQL 400. The return value of this function will be an SQL query. Fact__Tree__To__SQL is described using functions 400 to 465.

If the fact tree is to be mapped to an English description, Root is passed as the parameter to the function Fact__Tree__ To__Description (500). This function has no return value. The result of Fact Tree To Description will be to print out the description of the tree. Fact__Tree__To__Description is described using functions 500 to 535.

Tree Interpreter

Figure 25:
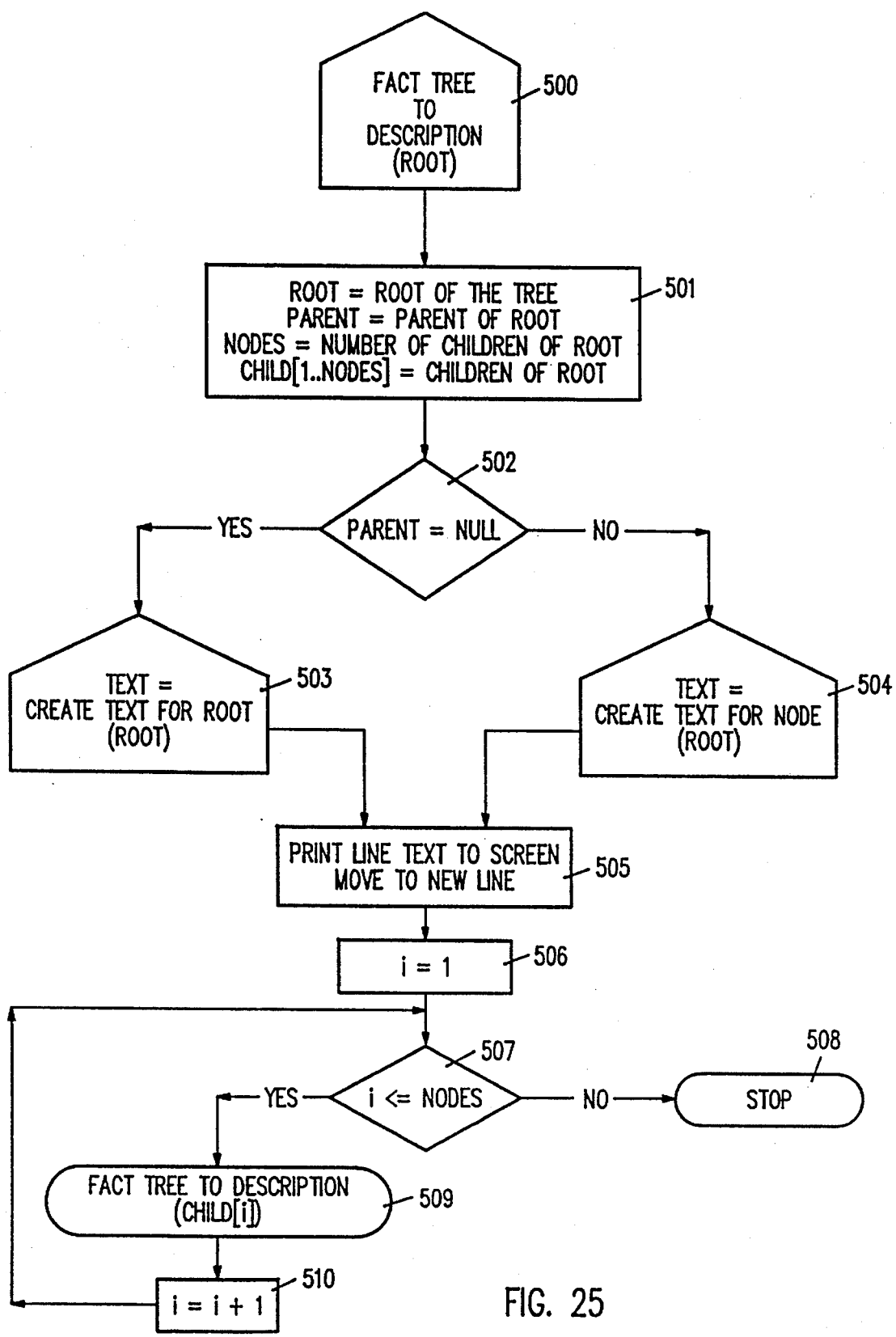
FIG. 25 is a flow chart of the Fact Tree to Description function invoked when a user selects the Tree Interpreter of the present invention.
Figure 26:
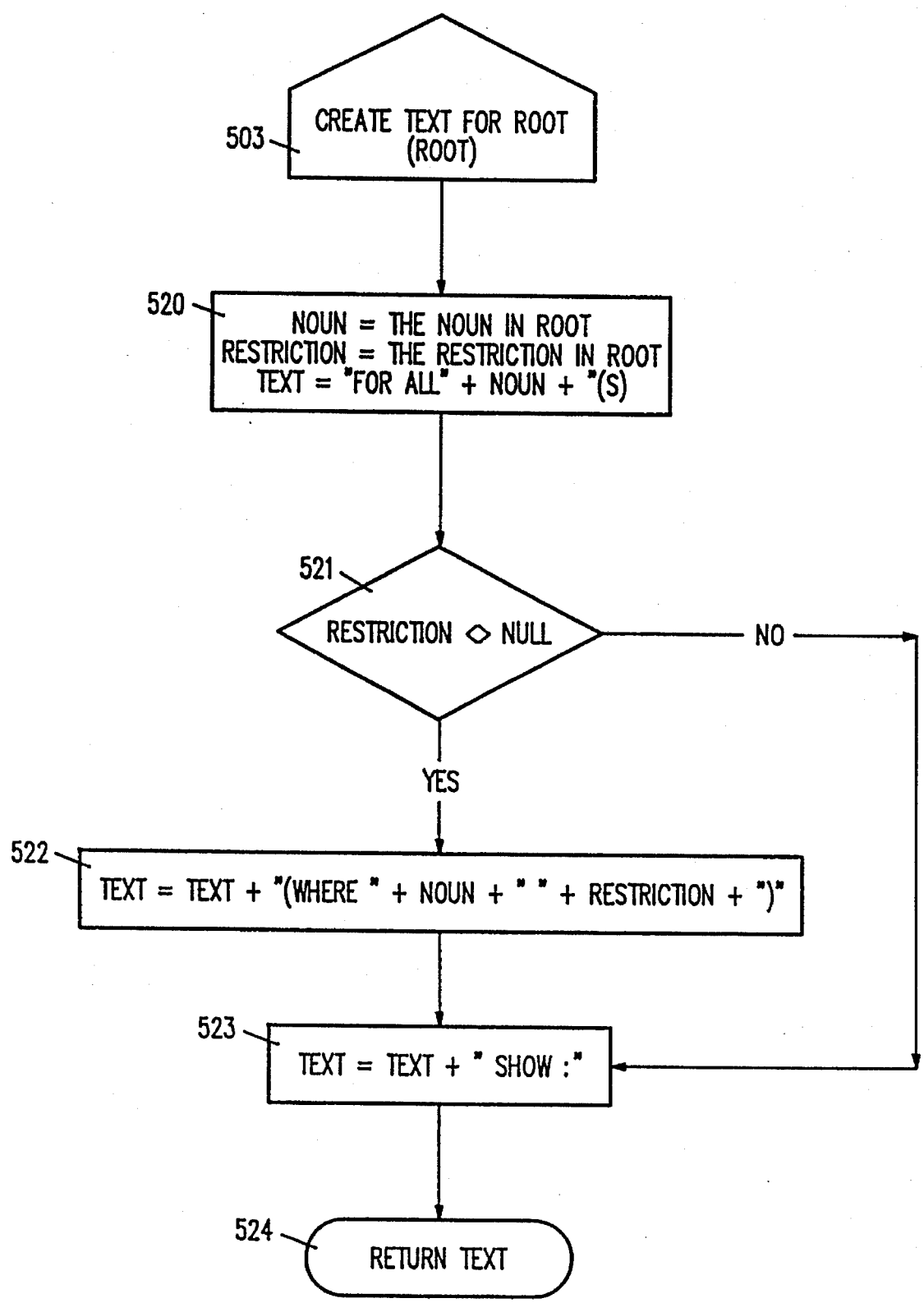
FIG. 26 is a flow chart of the Create Text for Root function invoked by the Fact Tree to Description function.

The present invention also provides a Tree Interpreter, invoked as "Fact__Tree__to__Description", a detailed description of which follows. Referring to FIG. 25, Fact__ Tree__To__Description (500) is a recursive function that takes a node of a fact tree as input and returns a description of the query represented by that tree or sub-tree. The parameter Root is the node on which the function is to operate.

Function 501 assigns some working variables. Root is the root of a tree of subtree that may or may not contain a parent and may or may not contain children. For example, if the shaded node in the example tree (Parent) was passed to Fact__Tree__To__Description, there would be no parent, and three children. Parent is assigned Root's parent (in this case NULL). Nodes is assigned the number of Root's children (three). Child i .. Nodes] is an array which is assigned Root's children (the three children of Person—"that lives at Address", "that has a phone number", and "that studies a subject".

Next, the temporary variable Text is assigned the "description" of the Root. (502–504). If Root has no parent (it is the root of the fact tree), the Root is passed to the function 503 Create__Text__For__Root (503), otherwise Root is passed to Function 507, Create__Text__For__Node. The return value of both of these functions is the description of Root.

At 505, Text is then printed out followed by a carriage return. If Root referred to the Person node, Function 503, Create Text For Root would have been used and Text would be "For all Person(s) (where Person=Mr Smith) show:" If Root referred to the "that studies Subject" node, function 504, Create Text For Node would have been used and Text would be "the Subject(s) that the Person studies, and for those Subject(s) show:".

The next step is to recursively process Root's children using a depth-first-search algorithm, detailed in functions 505–510. Nodes is the number of Root's children and Child i.. Nodes] are Root's actual children.

The variable I is used as a counter variable. It is initially assigned to 1 at 506. If I is greater than Nodes (there are no more children to process), this instantiation of Fact_Tree_To_Description is complete (507–508) otherwise, Fact_Tree_To_Description is invoked for Childi at 509, I is incremented at 510 and the loop continues (507) until there are no more children to process.

The result of Fact_Tree_To_Description applied to the Person node in the example tree would be:

| Output | |
|---|---|
| For all Person(s) (where Mr. Smith) show: | the Address that the Person lives at |
| the Subjects that the Person studies, | the Phone Number that the Person has |
| and for those subjects show: | Processing |
| The Person(s) that the Subject | Fact_Tree To .Description called on Person |
| is taught by | |
| | Fact_Tree To .Description called on |
| | that lives at Address |
| | Fact Tree To .Description called on |
| | that has phone number |
| | Fact_Tree To .Description called on |
| | that studies subject |
| | Fact Tree To Description called on |
| | that Is taught by Person |

Function 503, is invoked in FIG. 25 and Create_Text_For_Root, takes the root node of a fact tree as an argument (Root) and returns the description of that node.

At 520, Root contains a noun (e.g. Person); this is assigned to Noun. Root may also contain a Restriction (e.g.=Mr Smith); this is assigned to Restriction. The variable Text is assigned 'For all'+noun+'(s)' (e.g. 'For all Person(s)').

If Root contains a Restriction, that restriction is added to Text at 521 and 522. (e.g. Text="For all Person(s)(where Person=Mr Smith)")

"show": 'is added to Text at 523 and

Text is returned at 524 (e.g. Text="For all Person(s)(where Person=Mr Smith) show:").

Figure 27:
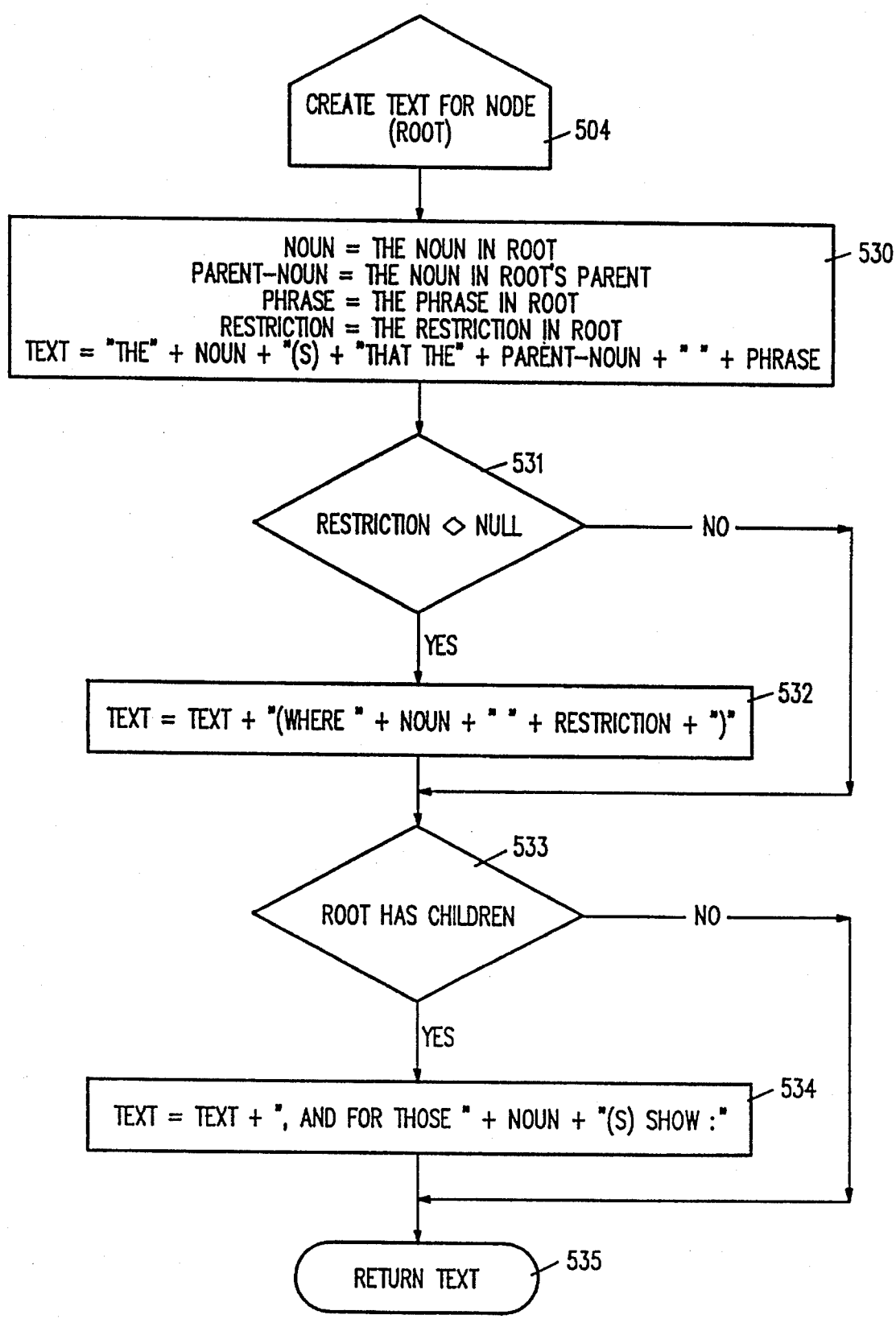
FIG. 27 is a flow chart illustrating the Create Text for Node function invoked by the Fact Tree to Description function.

Referring back to FIG. 25, Create_Text_For_Node (504), which takes a non-root node of a fact tree as an argument (Root) and returns the description of that node is detailed at FIG. 27. For example, the node 'that studies a Subject' could be passed as an argument.

At 530 Root contains a noun (e.g. Subject), this is assigned to Noun. Root contains a phrase (e.g. 'studies') this is assigned to Phrase. Root's parent contains a noun (e.g. Person), this is assigned to Parent-Noun. Root may also contain a Restriction (e.g.=Mr Smith) this is assigned to Restriction. The variable Text is assigned 'the'+noun+'(s) that the'+Parent-Noun+''+Phrase (e.g. 'the Subject(s) that the Person studies').

If Root contains a Restriction, that restriction is added to Text at 531 and 532.

If Root has children', and for those'+Noun+':(s) show:' is added to Text at 533 and 534.

At 535, Text is returned (e.g. Text='the Subject(s) that the Person studies, and for those Subject(s) show:').

Query Mapper

Figure 20:
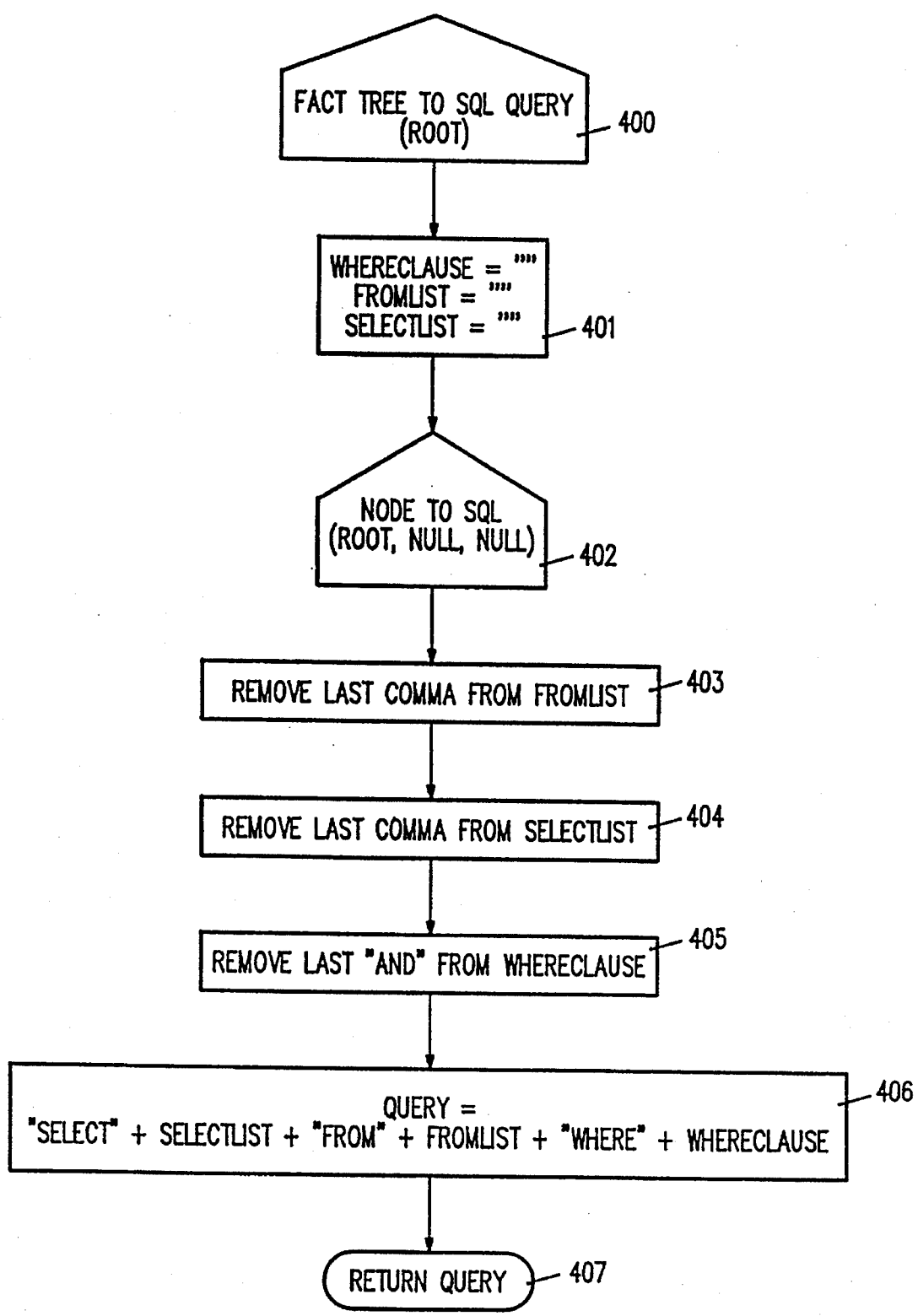
FIG. 20 is a flow chart representing the Fact Tree to SQL Query function invoked when a user selects the Query Mapper function of the present invention.

The present invention also provides a Query Mapper, invoked as "Fact_Tree_to_SQL_Query", a detailed description of which follows. Referring back to FIG. 19, function 400 is detailed at FIG. 20. This function takes the root node of a fact tree as input and returns an equivalent SQL query. The parameter Root is the root of the tree on which the function is to operate.

Each non-root node in the fact tree (all but the very top node) has a relational mapping associated with it. The relational mapping specifies the node's representation in a relational database. By way of example, for an example set of facts:

Person lives at address

Person has Phone Number

Person studies Subject

Subject is taught by Person if the relational database associated with an example fact tree is:

| Person_Table: | (Person, Address) |
|---|---|
| Phone_Table: | (Person, Phone Number) |
| Studies_Table: | (Person, Subject Studied) |
| Subject_Table: | (Subject, Teacher Person) |

The associated RMAP mappings would be:

| FACT | TABLE | FIRST NOUN COLUMN | SECOND NOUN COLUMN |
|---|---|---|---|
| Person lives at address | Person_Table | Person | Address |
| Person has Phone Number | Phone_table | Person | Phone Number |
| Person studies Subject | Studies_Table | Person | Subject Studies |
| Subject is taught by Person | Subject_Table | Person | Teacher Person |

Table denotes the table in which the fact is stored. First Noun Column denotes the column for the node's parent. Second Noun Column denotes the column for the node's noun.

For example, the mapping associated with (Person) lives at Address means that all addresses are stored in the Person Table table, with the people who live at them in the Person column and the actual addresses in the Address column.

The predicate mappings are derived by an algorithm similar to the one described in McCormack & Halpin, *Automated Mapping of Conceptual Schemas to Relational Schemas*, Proc CAiSE 93, Sorbonne University, Paris, 1993.

An SQL query contains three parts, a SelectList, a From List, and a WhereClause. These are gradually build up using recursive calls to Node_To_SQL.

Initially, SelectList, FromList, and WhereClause are set to the empty string (" ") at 401.

At 402, Node_To_SQL is called, with Root as its parameter, to build up the query.

At 403, 404 and 405, SelectList, FromList, and WhereClause are respectively formatted. At 406, the query is assembled as the result of the function and returned at 407.

Node_To_SQL is invoked at 402. This is a recursive function that maps a node of a fact tree into an SQL query. Successive calls to this function build up the SelectList, FromList, and WhereClause variables.

Node_To_SQL has three parameters. The first, Root, is the root of the tree or sub tree being mapped. The second and third parameters are the table and column used to join the query for Root's sub tree to the rest of the query.

At 410, Parent is the parent of Root, Nodes is the number of children of Root and child [i.. Nodes] are the children of Root.

If Root has no children, no processing is required so the function simply returns (411, 412).

Otherwise, the children of Root are added to the query as follows:

If Root has a parent, it needs to be joined into the query using the JoinTable and JoinColumn function 413 and 414; and Root needs to be added to the select list of the query at 415.

Figure 22:
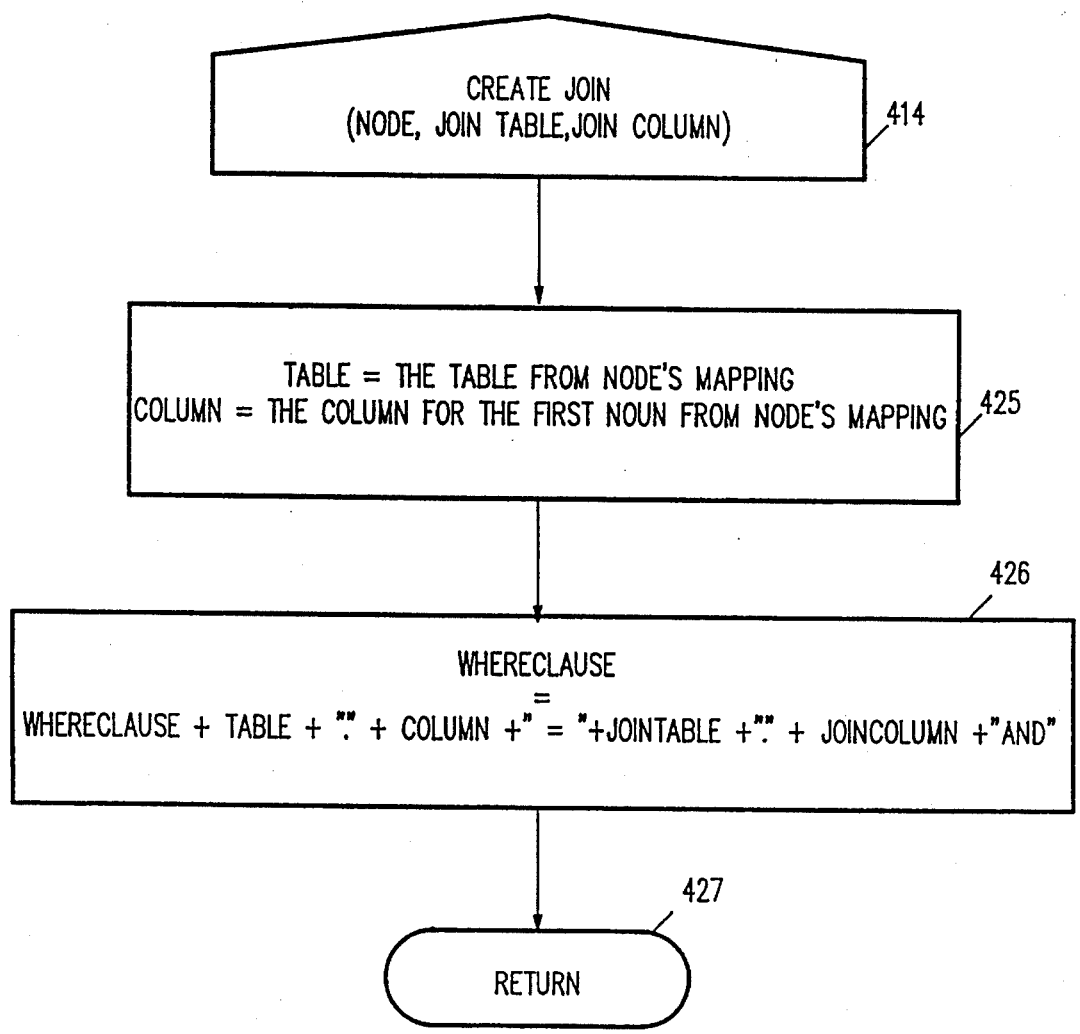
FIG. 22 is a flow chart representing the Create Join function invoked by the Node to SQL function.

To join all of Root's children into the query, they are processed sequentially as follows: The counter variable i is initialized to 1 at 416. The value of nodes is checked at 417; and if i is less than nodes Add_Selector_2 (node) is invoked at 419. Each child is added to the select-list using Add_Selector_2 at 419, and that child's children are added into the query using recursive calls to function 421, Node_To_SQL. The selector for each node is used to join the subtree's queries together at 420. Create_Join, invoked at 414 is detailed at FIG. 22. This function joins a subquery to the main query by adding an inner join to the where-clause. The join is based in the first noun in the passes node (Node) and the passed parameters.

Figure 21:
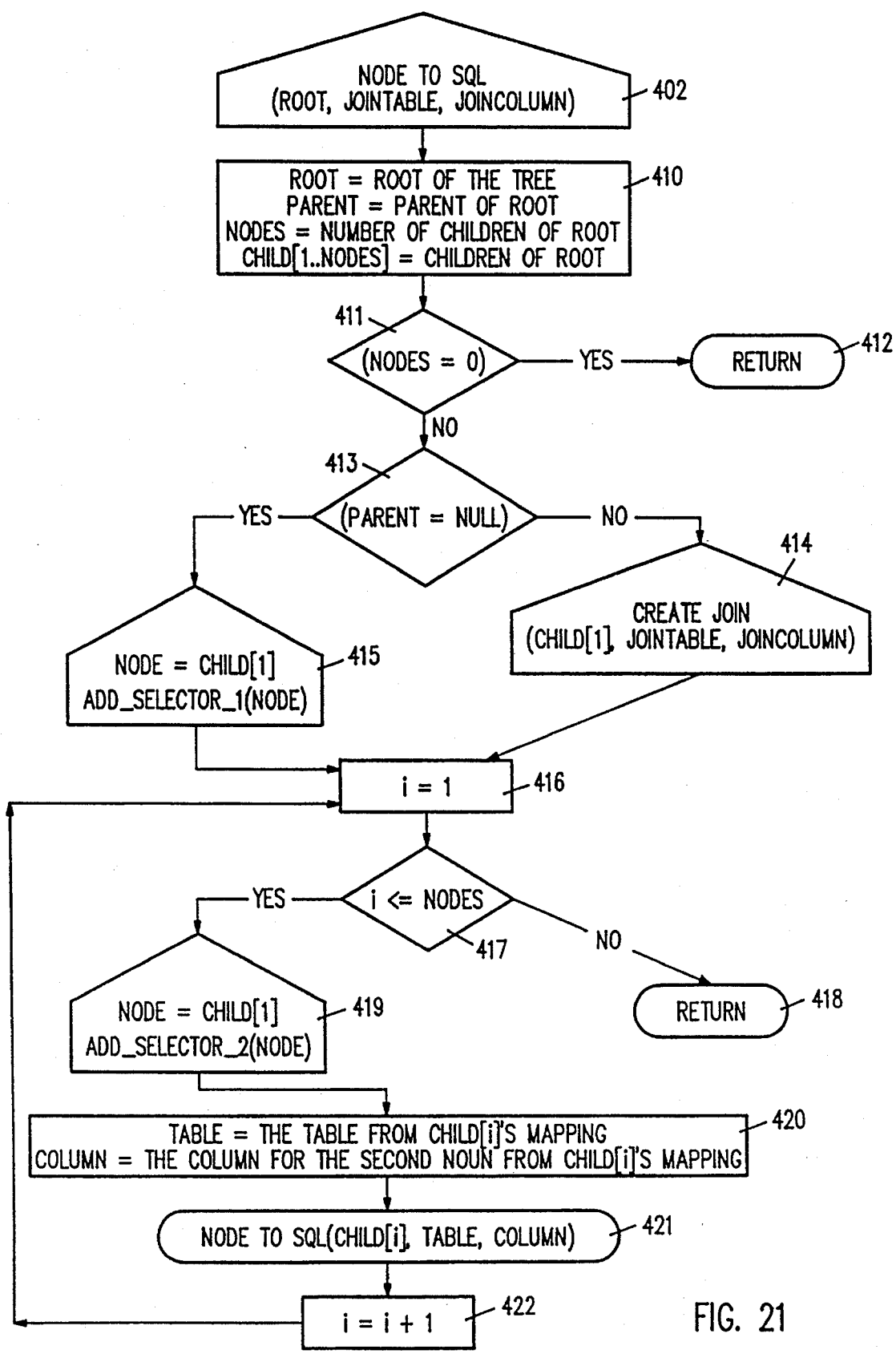
FIG. 21 is a flow chart illustrating the Node to SQL function invoked by the Fact Tree to SQL function.
Figure 23:
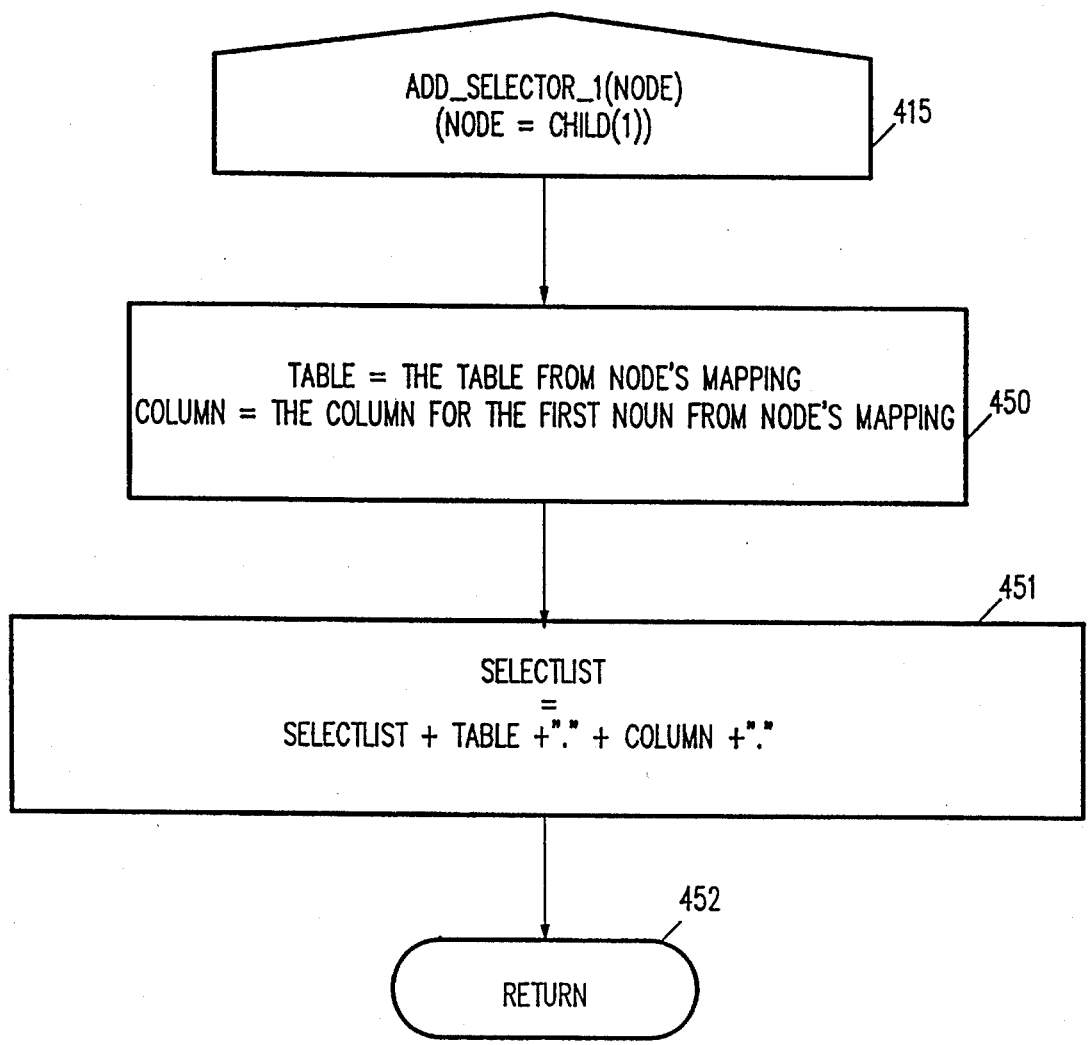
FIG. 23 is a flow chart illustrating the Add Selector 1 function invoked by the Node to SQL function.

Referring back to FIG. 21, function 415, Add_Selector_1 is detailed at FIG. 23. This function adds Node's table to the FromList and the column for Node's first noun to the SelectList.

Figure 24:
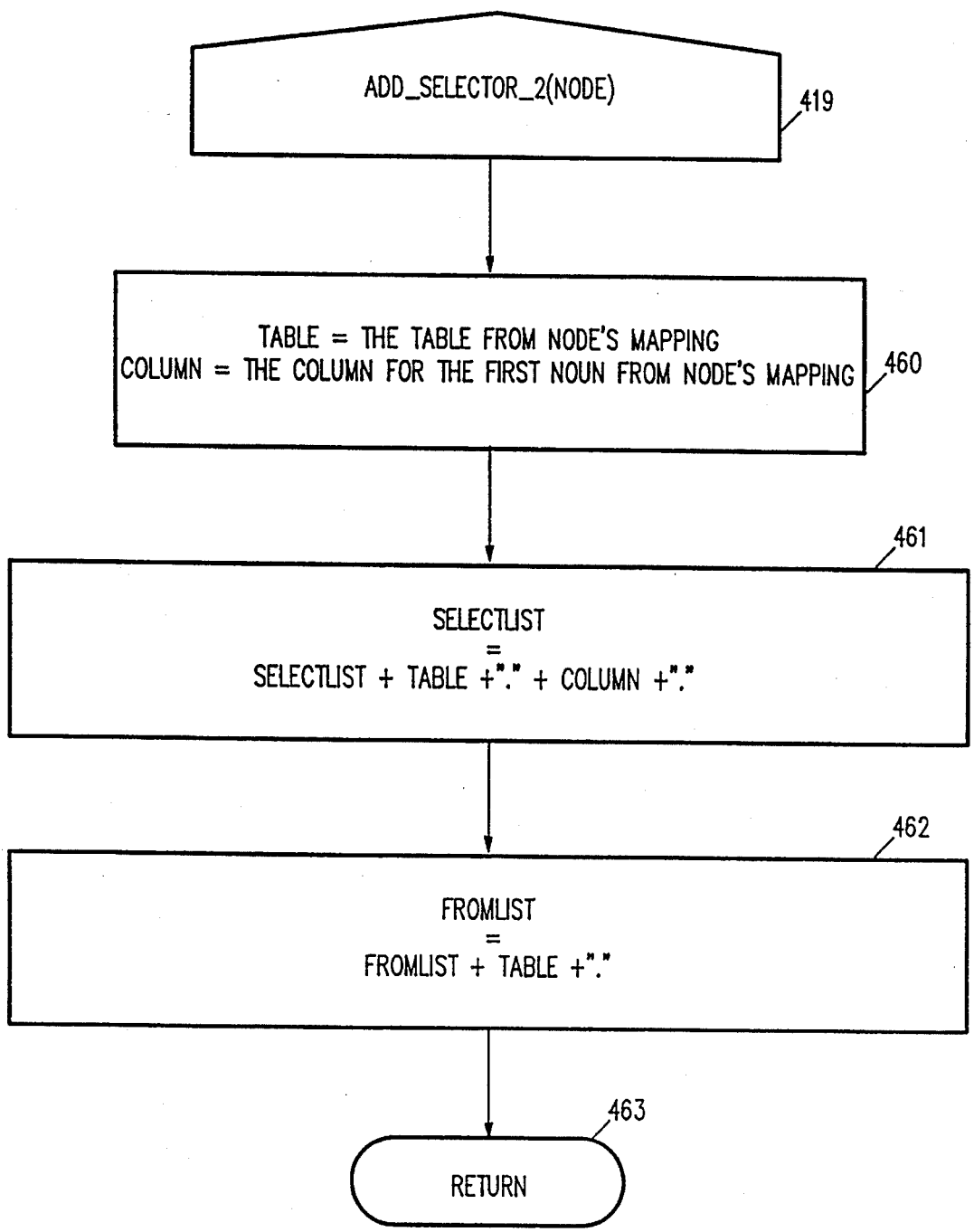
FIG. 24 is a flow chart illustrating the Add Selector 2 function invoked by the Node to SQL function.

Referring again to FIG. 21, function 419, Add_Selector_2 is detailed at FIG. 24. This function adds Node's table to the FromList and the column for Node's second noun to the SelectList.

It is to be understood that the above-described embodiments are merely illustrative of some of the many specific embodiments which represent applications of the principles of the present invention. Clearly, numerous variations can be readily devised by those skilled in the art without departing from the scope of the present invention.

What is claimed is:

1. Apparatus including a general purpose programmable digital computer, said computer having central processing means, bus means, display means, data entry means, memory means, data storage means, and graphical user interface for describing in a natural language a query to a database, said apparatus further comprising:

diagram means for producing a diagram on said display means;

cursor control means for moving a cursor over said diagram;

repository means further comprising relational database means implemented on said computer;

fact tree formation means for forming a fact tree based on said query; and fact tree description means for describing said fact tree in said natural language, said fact tree description means including (a) first variable assignment means for assigning variables based on said fact tree, said variables comprising root, parent, child and node, wherein said root is the root of said fact tree, said parent is the parent of said root, said child is the child of the root and said node is the number of the child, (b) parent test means for testing if a value of said parent is null, (c) root text creation means, responsive to a determination by said parent test means that said value of said parent is null, for creating text for said root, (d) node text creation means, responsive to a determination by said parent test means that a value of said parent is not null, for creating text for said node, (e) print means for printing, on said display means, said text created by said root text creation means and said node text creation means, (f) counter means for counting an iteration as an iteration value, (g) node test means for determining if said iteration value is equal to a value of said node, and (h) recursive means for recursively invoking said fact tree description means using depth-first search means.

2. The apparatus of claim 1, wherein said root text creation means further comprises:

second variable assignment means for assigning variables based on said fact tree, said variables comprising first noun, first restriction and first text wherein said first noun is the noun in said root, said first restriction is the restriction in said root and said first text is equal to the value of said noun and a phrase indicating totality;

first restriction test means for testing if a value of said first restriction is null;

first text modification means, responsive to a determination by said first restriction test means that a value of said first restriction is not null, for modifying said first text to be equal to said text and a word or phrase indicating presentation;

second text modification means, responsive to a determination by said first restriction test means that a value of said restriction is null, for modifying said text to be equal to said text and said noun and said restriction and a word or phrase indicating presentation; and first text return means for returning said text as modified by said first or said second text modification means to said fact tree description means.

3. The apparatus of claim 1, wherein said node text creation means further comprises:

third variable assignment means for assigning variables based on said fact tree, said variables comprising second noun, parent-noun, phrase, second restriction and second text wherein said second noun is a noun in said root, said parent-noun is a noun in said root's parent, said phrase is a phrase of said root, said restriction is a restriction in said root and said second text is equal to said second noun added to said parent-noun added to said phrase;

second restriction test means for testing if a value of said second restriction is null;

third text modification means, responsive to a determination by said second restriction test means that a value of said restriction is not null, for modifying said text to be equal to said second text added to said second noun added to said second restriction;

child testing means for testing if said root has said child;

fourth text modification means, responsive to a determination by said child test means that said root has said child, for modifying said text to be equal to said text added to said noun; and second text return means for returning said text to said fact tree description means.

4. Method for describing, in a natural language, a query to a database previously implemented on a general purpose programmable digital computer, said computer comprising central processing means, bus means, display means, data entry means, memory means, data storage means, graphical user interface and repository means further comprising relational database means implemented on said computer, said description method further comprising the steps of:

producing a diagram on said display means;

moving a cursor over said diagram;

forming a fact tree based on said query; and describing said fact tree in said natural language, said step of describing said fact tree further comprising the steps of (a) assigning variables based on said fact tree, said variables comprising root, parent, child and node, wherein said root is the root of said fact tree, said parent is the parent of said root, said child is the child of the root and said node is the number of the child using a first variable assignment method, (b) testing if a value of said parent is null using a parent test method, (c) creating text for said root using a root text creation method, responsive to a determination by said parent test method that said value of said parent is null, (d) creating text for said node using a node text creation method, responsive to a determination by said parent test method that a value of said parent is not null, (e) printing, on said display means, said text created by said root text creation method and said node text creation method using a print method, (f) counter method for counting an iteration as an iteration value, (g) determining if said iteration value is equal to a value of said node using a node test method, and (h) recursively invoking said fact tree description method using a depth-first recursive search method.

5. The method of claim 4, said root text creation method further comprising the steps of:

assigning variables based on said fact tree, said variables comprising first noun, first restriction and first text, wherein said first noun is the noun in said root, said first restriction is the restriction in said root and said first text is equal to the value of said first noun and a phrase indicating totality using a second variable assignment method;

testing if a value of said first restriction is null using a first restriction test method;

modifying said first text to be equal to said first text having and a word or phrase indicating presentation using a first text modification method, said first text modification method responsive to a determination by said first restriction test method that a value of said first restriction is not null;

modifying said text to be equal to said text and said noun and said restriction and a word or phrase indicating presentation using a second text modification method, said second text modification method responsive to a determination by said first restriction test method that a value of said restriction is null; and returning said text as modified by said first or said second text modification method to said fact tree description method using a first text return method.

6. The method of claim 4, wherein said node text creation method further comprises the steps of:

assigning variables based on said fact tree, said variables comprising second noun, parent-noun, phrase, second restriction and second text wherein said second noun is a noun in said root, said parent-noun is the noun in root's parent, said phrase is the phrase of the root, said second restriction is a restriction in said root and said second text is equal to said second noun added to said parent noun added to said phrase, said method of assigning variables using a third variable assignment method;

testing if a value of said restriction is null using a second restriction test method;

modifying said text, responsive to a determination by said second restriction test method that a value of said restriction is not null, to be equal to said text added to said noun added to said restriction, using a third text modification method;

testing if said root has said children using a child testing method;

modifying said text, responsive to a determination by said child testing method that said root has said children; and second text return method for returning said text to said fact tree description method.

7. A method for defining a query of an information system, the information system having been created using drag-and-drop information system specification means utilizing a computer language having both textual and graphical forms for translating the natural language-like constructs into object-role modeling symbology, the specification means further for entering text onto the display device utilizing the textual form of the computer language, for parsing the text into at least one of object, fact and constraint into the repository, and for forming a conceptual schema diagram representing the information system on the display device utilizing the graphical form of the computer language, and for mapping the conceptual schema to a database, the apparatus implemented on a programmable computer including memory, data entry means, data display means, a graphical user interface, and having a repository implemented thereon, the apparatus using natural language-like constructs for querying the information system and further comprising:

means for displaying the conceptual schema utilizing the graphical form of the computer language;

drag and drop cursor control means for moving a cursor over the conceptual schema diagram, and for selecting a first object therefrom;

fact tree formation means for forming a fact tree from a first object stored in the repository and displayed on the conceptual schema diagram, the first object forming the root node of a fact tree; and fact tree description means for describing the fact tree with natural language-like constructs on the data display means, utilizing the textual form of the computer language.

8. The apparatus of claim 7 wherein:

the cursor control means is further for selecting at least one fact relevant to the first object from the conceptual schema display means; and the fact tree formation means is further for forming the fact tree from the first object and the fact, the fact forming a child node of the root node.

9. The apparatus of claim 7 wherein:

the cursor control means is further for selecting a constraint relevant to the first object from the conceptual schema display means; and the fact tree formation means is further for forming the fact tree from the first object and the constraint, the constraint limiting the object.

10. Method for defining a query of an information system, the information system having been created using drag-and-drop information system specification means utilizing a computer language having both textual and graphical forms for translating the natural language-like constructs into object-role modeling symbology, the specification means further for entering text onto the display device utilizing the textual form of the computer language, for parsing the text into at least one of object, fact and constraint into the repository, and for forming a conceptual schema diagram representing the information system on the display device utilizing the graphical form of the computer language, and for mapping the conceptual schema to a database, the apparatus implemented on a programmable computer including memory, data entry means, data display means, a graphical user interface, and having a repository implemented thereon, the apparatus using natural language-like constructs for querying the information system and further comprising the steps of:

displaying the conceptual schema the display device utilizing the graphical form of the computer language;

moving a cursor over the conceptual schema diagram with a drag and drop cursor control means, and selecting a first object from the diagram;

forming a fact tree from a first object stored in the repository and displayed on the conceptual schema diagram, the first object forming the root node of a fact tree; and describing the fact tree with natural language-like constructs on the data display means utilizing the textual form of the computer language.

11. The method of claim 10 further comprising the steps of:

selecting at least one fact relevant to the first object from the conceptual schema display means; and forming the fact tree from the first object and the fact, the fact forming a child node of the root node.

12. The method of claim 10 further comprising the steps of:

selecting a constraint relevant to the first object from the conceptual schema display means, the constraint limiting the object; and forming the fact tree from the first object and the constraint.

* * * * *